United States Patent
Aryal et al.

(10) Patent No.: US 12,398,324 B1
(45) Date of Patent: Aug. 26, 2025

(54) METHODS FOR CONTROLLING THE PITCH OF SELF-ASSEMBLED IONIC LIQUID CRYSTAL (ILC) STRUCTURES

(71) Applicant: Tokyo Electron Limited, Tokyo (JP)

(72) Inventors: Dipak Aryal, Austin, TX (US); Kate Abel, Austin, TX (US); Takeo Nakano, Nirasaki (JP); Tamotsu Morimoto, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 18/677,972

(22) Filed: May 30, 2024

(51) Int. Cl.
| | |
|---|---|
| C09K 19/40 | (2006.01) |
| C07F 5/00 | (2006.01) |
| C07F 5/02 | (2006.01) |
| C07F 5/06 | (2006.01) |
| G02F 1/1341 | (2006.01) |

(52) U.S. Cl.
CPC ............ C09K 19/404 (2013.01); C07F 5/003 (2013.01); C07F 5/022 (2013.01); C07F 5/069 (2013.01); C09K 19/40 (2013.01); G02F 1/1341 (2013.01)

(58) Field of Classification Search
CPC ....... C09K 19/404; C09K 19/40; C07F 5/003; C07F 5/022; C07F 5/069; G02F 1/1341
See application file for complete search history.

(56) References Cited

U.S. PATENT DOCUMENTS

| | | | |
|---|---|---|---|
| 8,048,795 B2 | 11/2011 | Lee et al. | |
| 8,669,645 B2 | 3/2014 | Millward et al. | |
| 8,900,963 B2 | 12/2014 | Sills et al. | |
| 2018/0208728 A1* | 7/2018 | Gin | ..................... B01D 67/0006 |
| 2019/0211130 A1 | 7/2019 | Morita et al. | |
| 2023/0036175 A1 | 2/2023 | Arnold et al. | |
| 2023/0230855 A1* | 7/2023 | Nakano | ............. H01L 21/02697 427/421.1 |
| 2025/0157810 A1* | 5/2025 | Abel | ................... H01L 21/0274 |
| 2025/0157820 A1* | 5/2025 | Aryal | .................. H01L 21/0332 |

FOREIGN PATENT DOCUMENTS

KR 20190051877 5/2019

OTHER PUBLICATIONS

Zhang et al., "Near Room Temperature Multilevel Resistive Switching Memory With Thin Film Ionic Liquid Crystals", Royal Society of Chemistry, Journal of Material Chemistry C, vol. 12, No. 25, May 2024, 7 pgs.

(Continued)

*Primary Examiner* — James M Mellott
(74) *Attorney, Agent, or Firm* — Egan, Enders & Huston LLP

(57) ABSTRACT

Embodiments of improved methods are provided to form ordered structures on a surface of a substrate using direct self-assembly (DSA) of ionic liquid crystals (ILCs). More specifically, various embodiments of methods are provided to control the pitch of a layered structure formed on a substrate surface via self-assembly of ILCs having cation head groups, alkyl tail groups and anions. In the embodiments disclosed herein, the pitch of the layered structure is controlled by: (a) controlling the cation/anion charge ratio of the cation head groups and anions included within the ILCs, and/or (b) adding an ionic liquid to a solution comprising the ILCs.

22 Claims, 8 Drawing Sheets

(56) References Cited

OTHER PUBLICATIONS

Notification of Transmittal of the International Search Report and the Written Opinion of the International Searching Authority, or the Declaration, International Application No. PCT/US2025/019565, International Filing Date Mar. 12, 2025, Date of Mailing Jun. 23, 2025, 8 pgs.

Nickmans et al., "Directed Self-Assembly of Liquid-Crystalline Molecular Building Blocks for Sub-5 nm Nanopatterning", Advanced Materials, Progress Report, Adv. Mater. 2018, 16 pgs.

Hayashi et al., "Discovery of a Magnetic Ionic Liquid [bmim]FeCi4", Chemistry Letters vol. 33, No. 12, 2004, 2 pgs.

Fernandez et al., "Key Developments in Ionic Liquid Crystals", International Journal of Molecular Sciences, 2016, 31 pgs.

Pinto-Gomez et al., "Directed Self-Assembly of Block Copolymers for the Fabrication of Functional Devices", MDPI, 2020, 21 pgs.

Zhong et al., "Syntheses, Structures, and Properties of a Series of Metal Ion-Containing Dialkylimidazolium Ionic Liquids", The Chemical Society of Japan, 2007, 11 pgs.

Konwar et al., "Transition Metal Containing Ionic Liquid-Assisted One-Pot Synthesis of Pyrazoles at Room Temperature", J. Chem. Sci., 2019, 9 pgs.

Ding et al., "Transition Metal-Containing Ionic Liquid Crystals With 1-Decyl-2, 3-Dimethylimidazolium; Facile Syntheses, Crystal Structures, Thermal Properties and NH3 Detection", Wiley-VCH, Chemistry-Europe on Line Library, 2018, 7 pgs.

Kapernaum et al., "Current Topics in Ionic Liquid Crystals", Chemistry Europe, ChemPlusChem, 2022, 38 pgs.

Saielli, "Comparison of the Ionic Liquid Crystal Phase of [C12C1im][BF4] and [C12c1im]C1 By Atomistic MD Simulations", Crystals, MDPI, Mar. 2020, 10 pgs.

Renier et al., "Developing Design Tools for Introducing and Tuning Structural Order in Ionic Liquids", Royal Society of Chemistry, CrystEngComm, 2021, 11 pgs.

Pulukkody et al., "Mesomorphism of Imidazolium-Based Fluorinated Ionic Liquids", Journal of Ionic Liquids, 2024, 8 pgs.

Wang et al., "Regulating the Mesogenic Properties of Imidazolium Salts By Modifying N3-Substituents", Science China Chemistry, vol. 58, No. 12, 2015, 7 pgs.

Kloos et al., "Self-Assembling Liquid Crystals as Building Blocks to Design Nanoporous Membranes Suitable for Molecular Separations", Journal of Membrane Science, 2021, 18 pgs.

* cited by examiner

C12mim: 1-dodecyl-3-methylimidazolium 2 x C12mim 3 x C12mim

METHODS FOR CONTROLLING THE PITCH OF SELF-ASSEMBLED IONIC LIQUID CRYSTAL (ILC) STRUCTURES

RELATED APPLICATION DATA

This application is related to co-pending U.S. patent application Ser. No. 18/388,222, filed Nov. 9, 2023, entitled "Methods for Patterning a Semiconductor Substrate Using Metalate Salt Ionic Liquid Crystals," co-pending U.S. patent application Ser. No. 18/388,240, filed Nov. 9, 2023, entitled "Methods for Forming Vertically Layered Ionic Liquid Crystal (ILC) Structures on a Semiconductor Substrate," and co-pending U.S. patent application Ser. No. 18/677,975, filed May 30, 2024, entitled "Methods for Controlling the Phase of Self-Assembled Ionic Liquid Crystal (ILC) Structures;" the disclosures of which are expressly incorporated herein, in their entirety, by reference.

TECHNICAL FIELD

The present disclosure relates to the processing of semiconductor substrates. In particular, it provides improved methods for controlling the pitch of ionic liquid crystal (ILC) structures, which self-assemble on semiconductor substrates.

BACKGROUND

Semiconductor devices, such as integrated circuits (ICs), are fabricated by sequentially depositing and patterning layers of dielectric, conductive, and semiconductor materials over a semiconductor substrate to form a network of electronic components and interconnect elements (e.g., transistors, resistors, capacitors, metal lines, contacts, and vias), which are integrated in a monolithic structure. At each successive technology node, the minimum feature sizes are shrunk to reduce cost by roughly doubling the component packing density.

A common patterning method uses a photolithography process, which includes photoresist coating, exposure and development steps, to form a desired pattern on a substrate surface that can be transferred to an underlying layer. In conventional photolithography processes, a substrate surface is coated with a light-sensitive photoresist film and exposed to light to convert exposed portions of the light-sensitive photoresist film to a reacted photoresist. After exposure, a developing step is performed to remove the reacted (or unreacted) portion of the photoresist film for patterning, thus providing a photoresist pattern on the substrate.

In this technique, the resolution of the optical system used to perform the lithography step limits the minimum feature size that can be patterned with acceptable control and the minimum pitch between the features in the pattern. According to the Rayleigh criterion, the minimum feature size is proportional to the wavelength ($\lambda$) of light used for imaging, and inversely proportional to the numerical aperture (NA) of the projection lens. Over time, shorter wavelengths of light—from visible wavelengths (436 nm) to UV (365 nm), deep-UV (248 and 193 nm) and extreme-UV (EUV, 13.5 nm) wavelengths—have been utilized to reduce the feature size and pitch obtainable for advanced technology nodes. Today, EUV lithography is commonly used at the industry level for advanced patterning at 10 nm, 7 nm and 5 nm technology nodes.

As feature sizes continue to scale below 5 nm, it becomes desirable to produce patterns with critical dimensions (CDs) smaller than the wavelengths of light widely available for industrial applications. This requires new pattern-transfer methods, since the resolution of the optical system remains limited by the wavelength ($\lambda$) of light used for imaging. One method for achieving suitable photolithography for increasingly smaller CDs is to use a multi-patterning technique for pitch splitting or pitch multiplication. Examples of multi-patterning techniques include self-aligned double patterning (SADP), self-aligned triple patterning (SATP) and self-aligned quadruple patterning (SAQP). These multi-patterning techniques involve the utilization of sidewall spacers, fill layers and selective etching for defining structures at pitches, which are less than the original photolithography pitch.

Direct self-assembly (DSA) of polymers and other small molecules has recently been investigated as another pitch multiplier for pattern transfer technology. In these methods, large templates are patterned to direct the molecular self-assembly of polymers or other small molecules, which self-assemble within the larger template to produce substantially smaller pitch patterns. The self-assembled patterns are then used as the template for pattern transfer.

DSA of block copolymers (BCPs) has been widely investigated as a pitch multiplier for pattern-transfer technology, due to its high resolution, low cost and ease of integration and scalability. BCPs are macromolecules consisting of covalently bonded homogeneous blocks (or chains) of chemically different monomers. Due to the dis-affinity and repulsion forces between these blocks, BCPs phase segregate into microdomains to generate self-assembled patterns within the nano/microscale domain. After self-assembly, one of the blocks is removed and the remaining polymer is used as mask to pattern the underlying substrate.

Although DSA of block copolymers has received much attention, there are several issues preventing their integration into the semiconductor patterning process. First, since the characteristic dimensions of BCPs are controlled by the molecular weight of the polymer, the minimum pitch that can be achieved through BCP self-assembly is currently limited to 10 nm. Thus, DSA of block copolymers cannot be used as a pitch multiplier for pattern transfer at sub-10 nm feature sizes. Second, BCPs are soft organic building blocks that have a tendency to form arbitrarily oriented poly-domain structures when left unguided. This prevents their use in pattern transfer technology.

Ionic liquid crystals (ILCs) have recently been proposed as another class of materials for molecular self-assembly. Ionic liquid crystals are salts having properties of ionic liquids (ILs) and liquid crystals (LCs). FIG. 1A shows a mapping of coarse grain (CG) particles within an example ILC molecule 100. As shown in FIG. 1A, the ILC molecule 100 (e.g., 1-dodecyl-3-methylimidazolium tetrafluoroborate) contains a cation head group (e.g., an imidazolium-based cation) covalently bound to an elongated alkyl tail group and an anion (e.g., tetrafluoroborate, $BF_4^-$). Due to the difference in polarity between the ionic groups, ILCs spontaneously segregate into ordered phases (otherwise referred to as ordered structures) at or near room temperature.

FIG. 1B shows one example of an ordered structure formed by direct self-assembly of the ILC molecules shown in FIG. 1A. One dominant phase of the self-assembled ILC is a lamellar structure 110 of alternating distinct layers. As shown in FIG. 1B, the lamellar structure 110 includes a first distinct layer 120 (approximately 1 nm wide) containing the cation head groups and anions of the ILCs, and a second distinct layer 130 (approximately 2 nm wide) containing the interdigitated alkyl tail groups of the ILCs. The pitch (p) between the alternating layers of the lamellar structure 110 is equal to the combined width (approximately 3 nm) of the head and tail groups of the self-assembled ILCs. Although other phases may be formed, the lamellar structure 110 shown in FIG. 1B (otherwise referred to herein as a layered structure) may be particularly useful in the patterning of features on a substrate at sub-5 nm pitch.

Similar to block copolymers, ILCs self-assemble into ordered structures, albeit at a much smaller scale. The ordered structures produced by self-assembled ILCs can be used for pitch multiplication in pattern transfer methods. However, controlling the pitch (p) of self-assembled ILCs remains challenging. New methods and processes are needed to overcome these challenges.

SUMMARY

The present disclosure provides various embodiments of methods to form ordered structures on a surface of a substrate using direct self-assembly (DSA) of ionic liquid crystals (ILCs). More specifically, the present disclosure provides various embodiments of methods to control the pitch of a layered structure formed on a substrate surface via self-assembly of ILCs having cation head groups, alkyl tail groups and anions. In the embodiments disclosed herein, the pitch of the layered structure is controlled by: (a) controlling the cation/anion charge ratio of the cation head groups and anions included within the ILCs, and/or (b) adding an ionic liquid to a solution comprising the ILCs.

According to one embodiment, a method is provided herein to control a pitch of a self-assembled ionic liquid crystal (ILC) structure formed on a substrate. The method may generally include providing a solution comprising ionic liquid crystals (ILCs) having cation head groups, alkyl tail groups and anions and depositing the solution onto a surface of a substrate. Once deposited, the ILCs self-assemble on the surface of the substrate to form a layered structure having alternating layers of head group layers and tail group layers, with the cation head groups and the anions segregated to the head group layers and the alkyl tail groups segregated to the tail group layers. The pitch between the alternating layers of the layered structure may be substantial equal to a combined width of one head group layer and one tail group layer. The method may further include controlling the pitch between the alternating layers of the layered structure by controlling a cation/anion charge ratio of the cation head groups and the anions included within the ILCs prior to depositing the solution onto the surface of the substrate. In some embodiments, the method 300 may use the layered structure to form a pattern on the substrate.

In some embodiments, the cation/anion charge ratio may be controlled by selecting the anions and the cation head groups included within the ILCs, so that a valency the anions is greater than a valency of the cation head groups to prevent interdigitation of the alkyl tail groups within the tail group layers and increase the pitch between the alternating layers of the layered structure. For example, the ILCs may comprise monovalent cation head groups (having a +1 charge) and divalent anions (having a −2 charge) or trivalent anions (having a −3 charge).

In some embodiments, imidazolium-based cation head groups may be combined with divalent anions to prevent interdigitation of the alkyl tail groups within the tail group layers and increase the pitch between the alternating layers of the layered structure. In some embodiments, the imidazolium-based cation head groups may be of the form: 1-$R_1$-3-$R_2$-imidazolium, where $R_1$ is an alkyl chain with a chain length ranging from 8-18 hydrocarbons, and $R_2$ is a methyl group. In one example embodiment, the imidazolium-based cation head groups may be 1-dodecyl-3-methylimidazolium. The divalent anions may include, but are not limited to, pentachloridoindate ($[InCl_5]^{2-}$), tetrachlorozincate ($[ZnCl_4]^{2-}$), hexachlorodizincate ($[Zn_2Cl_6]^2$, hexachlorotitanate ($[TiCl_6]^{2-}$), hexachlorozirconate ($[ZrCl_6]^{2-}$), decachlorodizirconate ($[Zr_2Cl_{10}]^{2-}$), hexachlorohafnate ($[HfCl_6]^{2-}$), decachlorodihafnate ($[Hf_2Cl_{10}]^{2-}$), tetrachloromanganate ($[MnCl_4]^{2-}$), tetrachloroferrate ($[FeCl_4]^{2-}$), tetrachlorocobaltate ($[CoCl_4]^{2-}$), tetrachloronicklate ($[NiCl_4]^{2-}$), tetrachloropaladate ($[PdCl_4]^{2-}$), tetrachloroplatinate ($[PtCl_4]^{2-}$), tetrachlorocuprate ($[CuCl_4]^{2-}$), octachlorotrizincate ($[Zn_3Cl_8]^{2-}$), decachlorotetrazincate ($[Zn_4Cl_{10}]^{2-}$), tetrachlorocadmate ($[CdCl_4]^{2-}$), hexachlorodicadmate ($[Cd_2Cl_6]^{2-}$), tetrachloromercurate ($[HgCl_4]^{2-}$), or tetrachloroplumbate ($[PbCl_4]^{2-}$).

In some embodiments, the cation/anion charge ratio may be controlled by selecting anions and cation head groups having equal valency. For example, ILCs having monovalent cation head groups and monovalent anions may be used to provide a 1:1 cation/anion charge ratio. When ILCs having monovalent cation head groups and anions self-assemble on the surface of the substrate to form the layered structure: (a) each monovalent anion assembles together with one monovalent cation head group within the head group layers of the layered structure to provide the self-assembled ILCs with charge neutrality, and (b) the alkyl tail groups interdigitate together within the tail group layers of the layered structure. In such embodiments, the pitch between the alternating layers of the layered structure may be equal to the combined width of the one head group layer and the interdigitated alkyl tail groups in the one tail group layer.

In some embodiments, imidazolium-based cation head groups may be combined with monovalent anions to provide a 1:1 cation/anion charge ratio. In some embodiments, the imidazolium-based cation head groups may be of the form: 1-$R_1$-3-$R_2$-imidazolium, where $R_1$ is an alkyl chain with a chain length ranging from 8-18 hydrocarbons, and $R_2$ is a methyl group. In one example embodiment, the imidazolium-based cation head groups may be 1-dodecyl-3-methylimidazolium. The monovalent anions may include, but are not limited to, tetrafluoroborate ($BF_4^-$), chloride ($Cl^-$), acetate ($CH_3COO^-$), hexafluorophosphate ($PF_6^-$), trifluoromethyl acetate ($C_3H_3F_3O_2^-$), nitrate ($NO_3^-$), dicyanamide ($C_2HN_3^-$), tetracyanoborate ($B(CN)_4^-$), trifluoromethane sulfonate ($CF_3O_3S^-$), bis((trifluoromethyl)sulfonyl)imdide ($[(CF_3SO_2)_2N]^-$), tetrachloroaluminate ($[AlCl_4]^-$), heptachlorodialuminate ($[Al_2Cl_7]^-$), decachlorotrialuminate ($[Al_3Cl_{10}]^-$), tridecachlorotetraaluminate ($[Al_4Cl_{13}]^-$), tetrachloroferrate ($Cl_4Fe^-$), trichlorostannate ($[SnCl_3]^-$), pentachlorodistannate ($[Sn_2Cl_5]^-$), tetrachloroindate ($[InCl_4]^-$), nonachlorodititanate ($[Ti_2Cl_9]^-$), nonachlorodizirconate ($[Zr_2Cl_9]^-$), nonachlorodihafnate ($[Hf_2Cl_9]^-$), tetrachloroaurate ($[AuCl_4]^-$), tetrachlorogallate ($[GaCl_4]^-$), heptachlorodigallate ($[Ga_2Cl_7]^-$), decachlorotrigallate ($[Ga_3Cl_{10}]^-$), or trichloroplumbate ($[PbCl_3]^-$).

In some embodiments, the cation/anion charge ratio may be controlled by selecting the anions and/or cation head groups of the ILCs, so that a valency of the anions is greater than the valency of the cation head groups of the ILCs. For example, ILCs having monovalent cation head groups may be combined with divalent anions to provide a 1:2 cation/anion charge ratio. When ILCs having monovalent cation head groups and divalent anions self-assemble on the surface of the substrate to form the layered structure: (a) each divalent anion assembles together with two monovalent cation head groups within the head group layers of the layered structure to provide the self-assembled ILCs with charge neutrality, and (b) the alkyl tail groups align tip-to-tip within the tail group layers of the layered structure. In such embodiments, the pitch between the alternating layers of the layered structure may be equal to the combined width of the one head group layer and the alkyl tail groups aligned tip-to-tip within the one tail group layer.

In some embodiments, imidazolium-based cation head groups may be combined with divalent anions to provide a 1:2 cation/anion charge ratio. In some embodiments, the imidazolium-based cation head groups may be of the form: 1-$R_1$-3-$R_2$-imidazolium, where $R_1$ is an alkyl chain with a chain length ranging from 8-18 hydrocarbons, and $R_2$ is a methyl group. In one example embodiment, the imidazolium-based cation head groups may be 1-dodecyl-3-methylimidazolium. The divalent anions may include, but are not limited to, pentachloridoindate ($[InCl_5]^{2-}$), tetrachlorozincate ($[ZnCl_4]^{2-}$), hexachlorodizincate ($[Zn_2Cl_6]^{2-}$), hexachlorotitanate ($[TiCl_6]^{2-}$), hexachlorozirconate ($[ZrCl_6]^{2-}$), decachlorodizirconate ($[Zr_2Cl_{10}]^{2-}$), hexachlorohafnate ($[HfCl_6]^{2-}$), decachlorodihafnate ($[Hf_2Cl_{10}]^{2-}$), tetrachloromanganate ($[MnCl_4]^{2-}$), tetrachloroferrate ($[FeCl_4]^{2-}$), tetrachlorocobaltate ($[CoCl_4]^{2-}$), tetrachloronicklate ($[NiCl_4]^{2-}$), tetrachloropaladate ($[PdCl_4]^{2-}$), tetrachloroplatinate ($[PtCl_4]^{2-}$), tetrachlorocuprate ($[CuCl_4]^{2-}$), octachlorotrizincate ($[Zn_3Cl_8]^{2-}$), decachlorotetrazincate ($[Zn_4Cl_{10}]^{2-}$), tetrachlorocadmate ($[CdCl_4]^{2-}$), hexachlorodicadmate ($[Cd_2Cl_6]^{2-}$), tetrachloromercurate ($[HgCl_4]^{2-}$), or tetrachloroplumbate ($[PbCl_4]^{2-}$).

Another method is provided to control a pitch of a self-assembled ionic liquid crystal (ILC) structure formed on a substrate. The method may generally include providing a solution comprising: (a) ionic liquid crystals (ILCs) having cation head groups, alkyl tail groups and anions, and (b) an ionic liquid (IL) having cation head groups and alkyl tail groups and depositing the solution onto a surface of a substrate. Once deposited, the ILCs and the IL self-assemble on the surface of the substrate to form a layered structure having alternating layers of head group layers and tail group layers, with the cation head groups and the anions segregated to the head group layers and the alkyl tail groups segregated to the tail group layers. The pitch between the alternating layers of the layered structure may be substantially equal to a combined width of one head group layer and one tail group layer. The method may further include controlling the pitch between the alternating layers of the layered structure by controlling a cation/anion charge ratio of the cation head groups included within the ILCs and the IL and the anions included within the ILCs prior to depositing the solution onto the surface of the substrate. In some embodiments, the method may use the layered structure to form a pattern on the substrate.

In some embodiments, the cation/anion charge ratio may be controlled by: (a) selecting the anions and/or cation head groups of the ILCs, so that a valency of the anions is greater than the valency of the cation head groups of the ILCs, and (b) selecting the cation head groups of the IL to balance the charge of the anions and cation head groups included within the head group layers of the layered structure. For example, the cation/anion charge ratio may be controlled by providing a solution that combines an ionic liquid (IL) having monovalent cation head groups with ILCs having monovalent cation head groups and divalent anions.

When ILCs having monovalent cation head groups and divalent anions and an IL having monovalent cation head groups self-assemble on the surface of the substrate to form the layered structure: (a) each divalent anion assembles together with one monovalent cation head group of the ILCs and one monovalent cation head group of the IL within the head group layers of the layered structure to provide the self-assembled ILCs with charge neutrality, and (b) the alkyl tail groups align tip-to-tip within the tail group layers of the layered structure. In such embodiments, the pitch between the alternating layers of the layered structure may be equal to the combined width of the one head group layer and the alkyl tail groups aligned tip-to-tip within the one tail group layer.

In some embodiments, the ILCs and the ionic liquid each comprise imidazolium-based cation head groups of the form: 1-$R_1$-3-methylimidazolium, where $R_1$ is an alkyl chain with a chain length ranging from 8-18 hydrocarbons for the ILCs and 1 7 hydrocarbons for the ionic liquid. In one example embodiment, the ILCs may comprise 1-dodecyl-3-methylimidazolium cation head groups and the IL may comprise 1-ethyl-3-methylimidazolium cation head groups.

A wide variety of divalent anions may be included within the ILCs. For example, the divalent anions may include, but are not limited to, pentachloridoindate ($[InCl_5]^{2-}$), tetrachlorozincate ($[ZnCl_4]^{2-}$), hexachlorodizincate ($[Zn_2Cl_6]^{2-}$), hexachlorotitanate ($[TiCl_6]^{2-}$), hexachlorozirconate ($[ZrCl_6]^{2-}$), decachlorodizirconate ($[Zr_2Cl_{10}]^{2-}$), hexachlorohafnate ($[HfCl_6]^{2-}$), decachlorodihafnate ($[Hf_2Cl_{10}]^{2-}$), tetrachloromanganate ($[MnCl_4]^{2-}$), tetrachloroferrate ($[FeCl_4]^{2-}$), tetrachlorocobaltate ($[CoCl_4]^{2-}$), tetrachloronicklate ($[NiCl_4]^{2-}$), tetrachloropaladate ($[PdCl_4]^{2-}$), tetrachloroplatinate ($[PtCl_4]^{2-}$), tetrachlorocuprate ($[CuCl_4]^{2-}$), octachlorotrizincate ($[Zn_3Cl_8]^{2-}$), decachlorotetrazincate ($[Zn_4Cl_{10}]^{2-}$), tetrachlorocadmate ($[CdCl_4]^{2-}$), hexachlorodicadmate ($[Cd_2Cl_6]^{2-}$), tetrachloromercurate ($[HgCl_4]^{2-}$), or tetrachloroplumbate ($[PbCl_4]^{2-}$).

As noted above and described further herein, the present disclosure provides various embodiments of methods for controlling the pitch of a self-assembled ILC structure formed on a substrate, as well as methods for patterning a substrate using a self-assembled ILC structure. Of course, the order of discussion of the different steps as described herein has been presented for the sake of clarity. In general, these steps can be performed in any suitable order. Additionally, although each of the different features, techniques, configurations, etc., herein may be discussed in different places of this disclosure, it is intended that each of the concepts can be executed independently of each other or in combination with each other. Accordingly, the present invention can be embodied and viewed in many different ways.

Note that this Summary section does not specify every embodiment and/or incrementally novel aspect of the present disclosure or claimed inventions. Instead, the summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

A more complete understanding of the present inventions and advantages thereof may be acquired by referring to the following description taken in conjunction with the accompanying drawings, in which like reference numbers indicate like features. It is to be noted, however, that the accompanying drawings illustrate only exemplary embodiments of the disclosed concepts and are therefore not to be considered limiting of the scope, for the disclosed concepts may admit to other equally effective embodiments.

DETAILED DESCRIPTION

Ionic liquid crystals (ILCs) self-assemble into solid (crystalline phase) ordered structures at or near room temperature. The difference in polarity between the cation head groups and the alkyl tail groups of the ILCs promote direct self-assembly of ILC molecules by segregating the head and tail groups into ordered structures, with the cation head groups and anions segregating to the head group layers and the alkyl tail groups segregating to the tail group layers. In some cases, the head and tail groups may be segregated into layered structures (or "lamellar structures") having either a horizontal or vertical orientation. It is generally well-known that the orientation of the layered structures can be controlled by controlling the deposition temperature and the hydrophobicity of the guide surface(s) upon which the ILCs are deposited, such as the underlying substrate surface and/or the sidewalls of a larger template pattern.

Figure 1A:
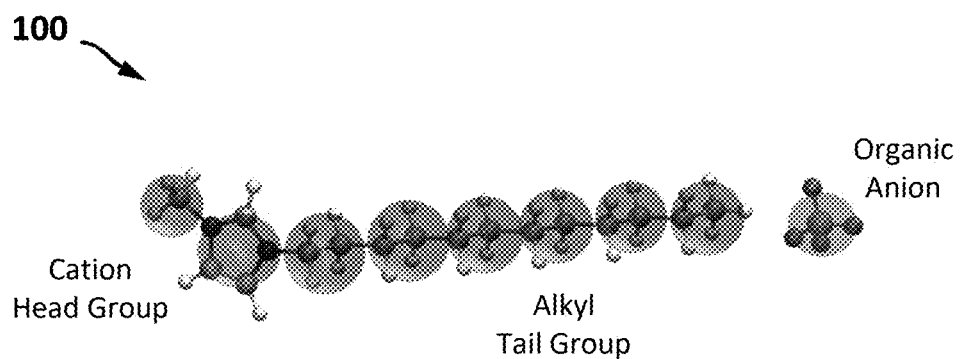
FIG. 1A is a mapping of coarse grain particles of an example ionic liquid crystal (ILC) molecule.
Figure 1B:
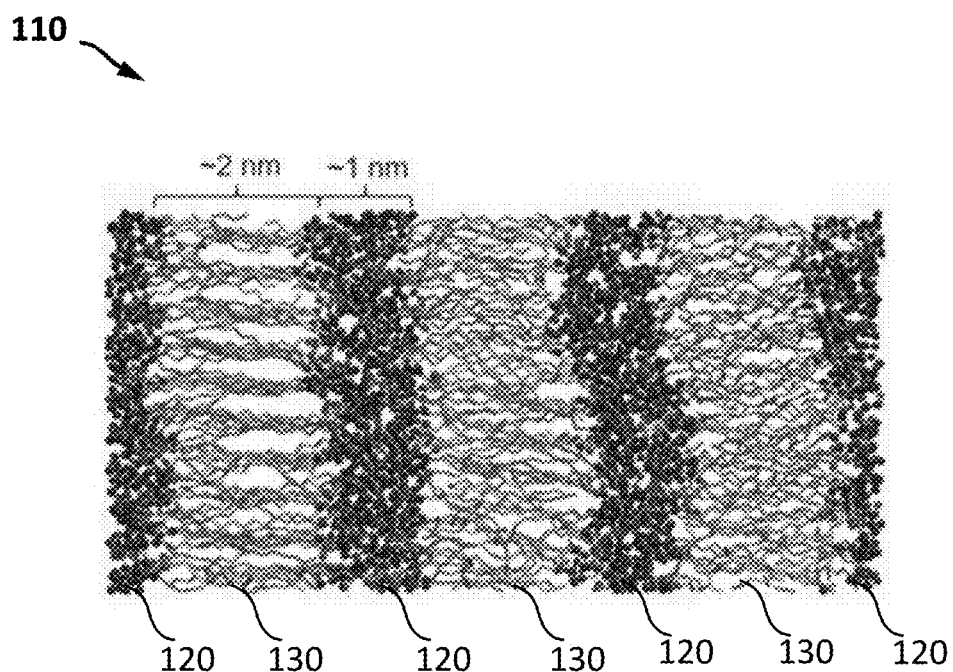
FIG. 1B illustrates one example of an ordered structure (i.e., a layered structure) formed by direct self-assembly (DSA) of the ILC molecules shown in FIG. 1A.
Figure 2A:
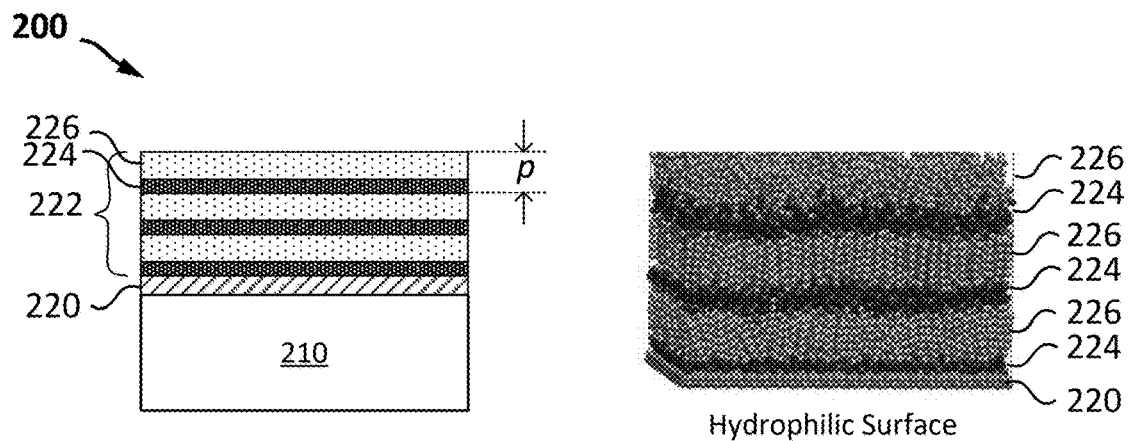
FIGS. 2A-2C provide course-grain simulations of various layered structures formed by DSA of the ILC molecules shown in FIG. 1A, illustrating how the self-assembly of ILCs can be controlled by modulating the hydrophobicity of guide surfaces.
Figure 2B:
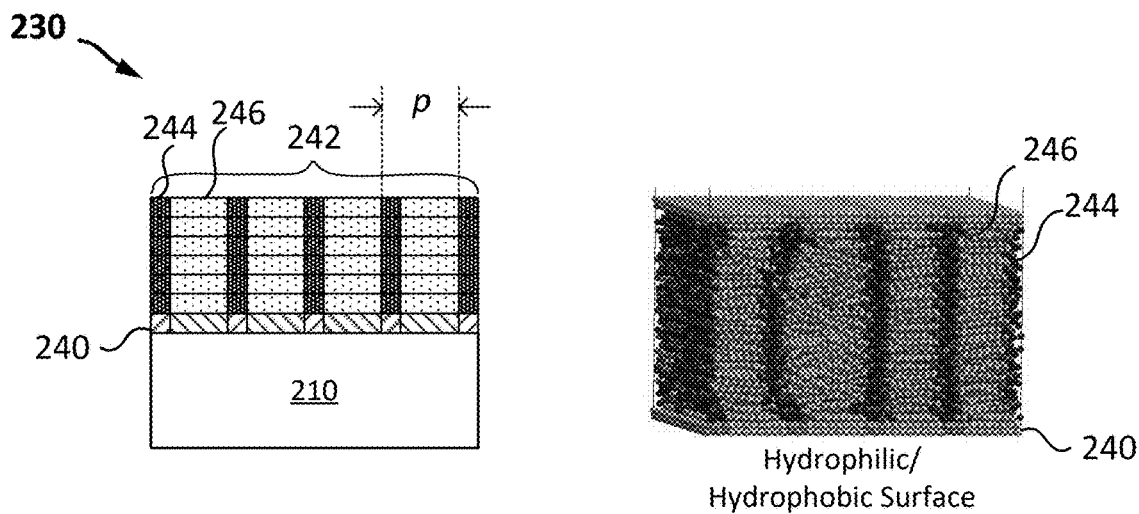

FIGS. 2A-2B show coarse-grained (CG) simulation results of various layered structures formed by the direct self-assembly (DSA) of an example ILC (e.g., 1-dodecyl-3-methylimidazolium tetrafluoroborate). In the embodiment 200 shown in FIG. 2A, an ILC solution comprising 1-dodecyl-3-methylimidazolium tetrafluoroborate ILCs is deposited onto a hydrophilic surface layer 220 provided on a substrate 210. As shown in FIG. 2A, the ILCs self-assemble on the hydrophilic surface layer 220 into a horizontally layered structure 222 containing alternating horizontal layers of cation head groups 224 and interdigitated alkyl tail groups 226.

Figure 2C:
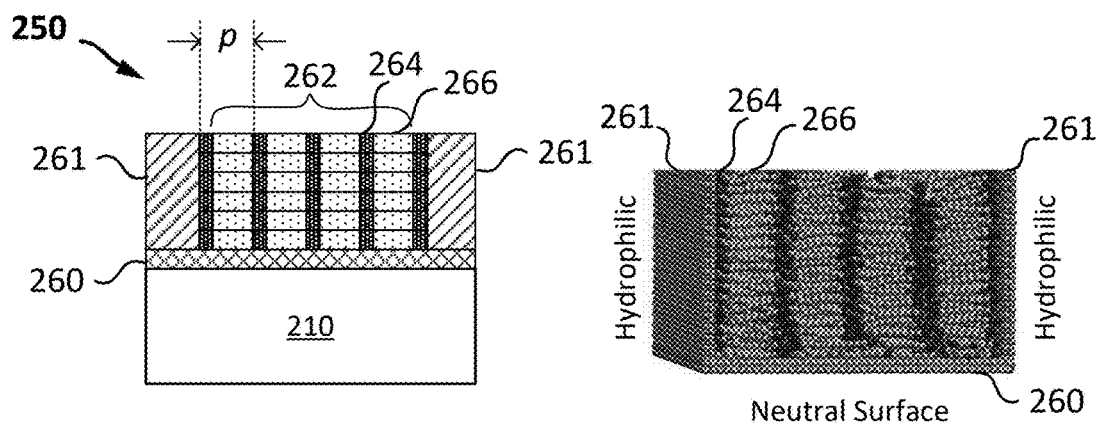

Vertically layered structures can be formed by assembling ILCs on other substrate surfaces, as shown in FIGS. 2B and 2C. In the embodiment 230 shown in FIG. 2B, the substrate 210 is provided with a periodic surface 240 comprising alternating hydrophilic and hydrophobic surface layers. When an ILC solution comprising 1-dodecyl-3-methylimidazolium tetrafluoroborate ILCs is deposited onto the periodic surface 240, the ILCs self-assemble into a vertically layered structure 242 containing alternating vertical layers of cation head groups 244 and interdigitated alkyl tail groups 246 with: (a) the cation head groups 244 vertically aligned with the hydrophilic surface layers of the periodic surface 240, and (b) the alkyl tail groups 246 vertically aligned with the hydrophobic surface layers of the periodic surface 240. In the embodiment 250 shown in FIG. 2C, a feature formed on the substrate 210 is provided with a neutral bottom surface 260 and hydrophilic sidewalls 261. As shown in FIG. 2C, self-assembly of the ILCs within the feature results in a vertically layered structure 262 containing alternating vertical layers of cation head groups 264 and interdigitated alkyl tail groups 266, with the cation head groups 264 oriented towards the hydrophilic sidewalls 261.

As shown in FIGS. 2A-2C, the difference in polarity between the cation head groups 224/244/264 and alkyl tail groups 226/246/266 promote self-assembly of the ILC molecules and segregate the head and tail groups into layered structures having horizontal (FIG. 2A) and vertical (FIGS. 2B and 2C) orientations. As shown in FIGS. 2A-2C, the pitch (p) between the alternating layers of the layered structures is equal to the combined width of the head and tail groups of the self-assembled ILC molecules. Since the pitch (p) is much smaller than what is currently achievable with photolithography, the vertically layered structures shown in FIGS. 2B and 2C can be used as patterns for pitch multiplication, as long as the patterns can be successfully transferred to the underlying substrate 210. Exemplary methods for forming vertically layered ILC structures, and for patterning substrates using such structures, are disclosed in co-pending U.S. patent application Ser. Nos. 18/388,240 and 18/388,222.

It is generally well-known in the art that the pitch (p) between the alternating layers of a horizontally or vertically oriented layered structure can be controlled by modulating the chain length of the alkyl tail groups included within the ILCs used to form the layered structure. In ILCs, the alkyl chain length ranges between 8-18 hydrocarbon molecules. Because 1-dodecyl-3-methylimidazolium-based ILCs have 12 hydrocarbon molecules in the alkyl chain, self-assembly of 1-dodecyl-3-methylimidazolium-based ILCs typically results in a layer pitch of about 3 nm. In some cases, the alkyl chain length of the ILCs may be increased to increase the pitch, or decreased to decrease the pitch, of the layered structure.

New methods are provided in the present disclosure for controlling the pitch between the alternating layers of a layered structure formed on a substrate surface via self-assembly of ILCs. In the disclosed embodiments, the pitch between the alternating layers of a layered structure is controlled by: (a) controlling a cation/anion charge ratio of the cation head groups and anions of the ILCs used to form the layered structure, and/or (b) adding an ionic liquid (IL) to a solution comprising the ILCs. In some embodiments, the alkyl chain length of the ILCs may also be changed to provide minor pitch adjustments.

In some embodiments, the pitch of a layered structure may be increased by combining divalent (or trivalent) anions with ILCs having monovalent cation head groups to change the cation/anion charge ratio of the ILCs from 1:1 to 1:2 (or 1:3). As described in more detail below, the charge difference between the divalent (or trivalent) anions and the monovalent cation head groups of the ILCs prevents the alkyl tails from interdigitating within the tail group layers of the layered structure. The increased separation of the alkyl tail groups within the tail group layers of the layered structure increases the pitch of the layered structure by increasing the width of the tail group layers.

In some embodiments, the pitch of the layered structure may further be increased by adding an ionic liquid (IL) having monovalent cation head groups to ILCs having monovalent cations and divalent anions. During self-assembly, the cation head groups of the ionic liquid segregate to the head group layers of the layered structure. Thus, adding an ionic liquid increases the pitch of the layered structure by increasing the width of the head group layers.

Figure 3:
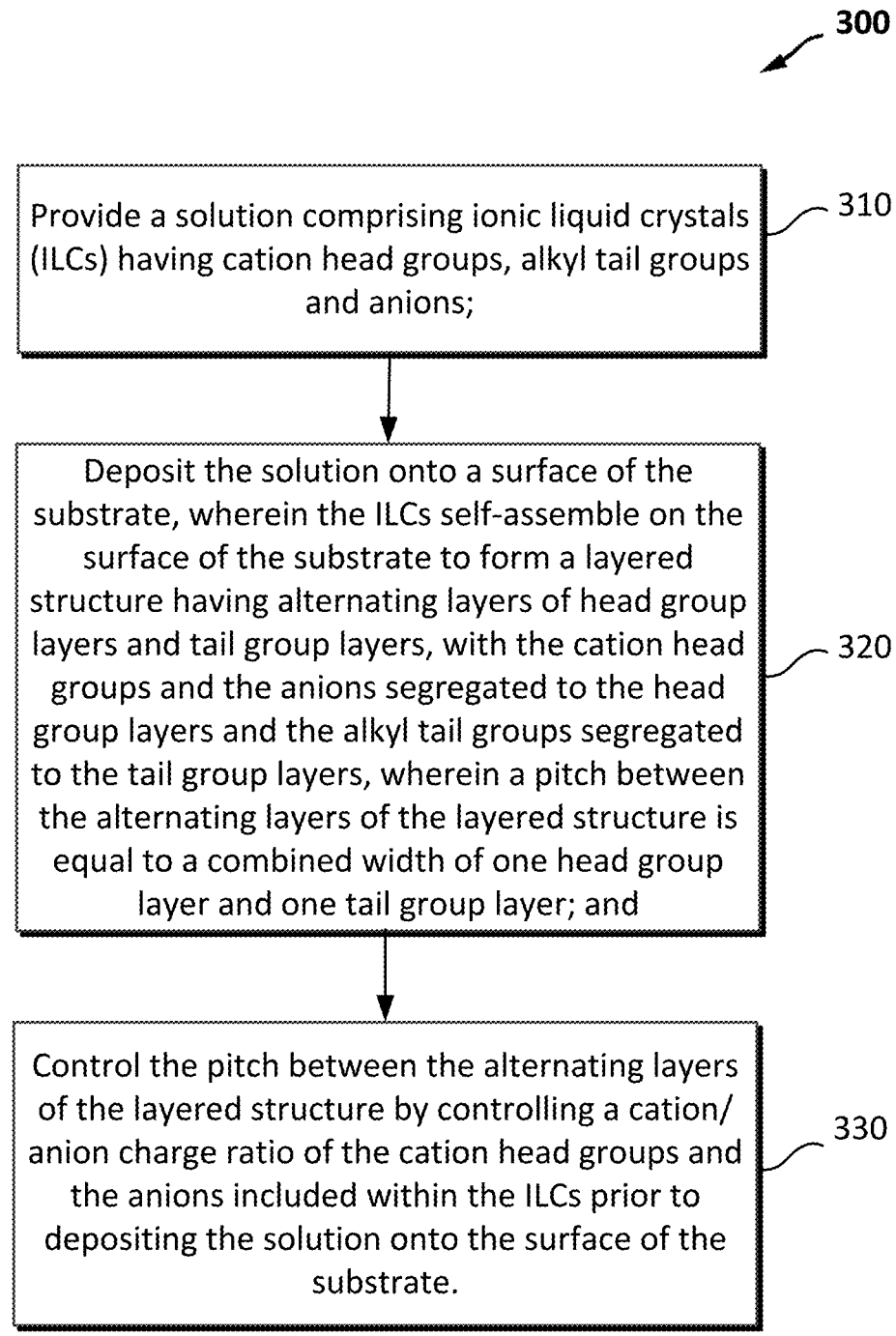
FIG. 3 is a flowchart diagram illustrating a method that may be used to control a pitch of a self-assembled ILC structure formed on a substrate in accordance with one embodiment of the present disclosure.

FIG. 3 illustrates one embodiment of a method 300 that uses the techniques disclosed herein to control a pitch of a self-assembled ILC structure formed on a substrate. It will be recognized that the embodiment of the method 300 shown in FIG. 3 is merely exemplary and additional methods may utilize the techniques described herein. Further, additional processing steps may be added to the method 300 shown in FIG. 3 as the steps described are not intended to be exclusive. Moreover, the order of the steps is not limited to the order shown in the figure as different orders may occur and/or various steps may be performed in combination or at the same time.

The method 300 includes providing a solution comprising ionic liquid crystals (ILCs) having cation head groups, alkyl tail groups and anions (in step 310) and depositing the solution onto a surface of a substrate (in step 320). Once deposited, the ILCs self-assemble on the surface of the substrate to form a layered structure having alternating layers of head group layers and tail group layers, with the cation head groups and the anions segregated to the head group layers and the alkyl tail groups segregated to the tail group layers. The pitch between the alternating layers of the layered structure may be substantial equal to a combined width of one head group layer and one tail group layer. The method 300 further includes controlling the pitch between the alternating layers of the layered structure by controlling a cation/anion charge ratio of the cation head groups and the anions included within the ILCs (in step 330) before the solution is deposited onto the surface of the substrate (in step 320). In some embodiments, the method 300 may use the layered structure to form a pattern on the substrate.

The ILCs used in the method 300 may include a wide variety of cation head groups. For example, the ILCs may include imidazolium, pyrazolium, pyrrolidinium, pyridinium, piperidinium, morpholinium, ammonium, phosphonium, sulphonium or cholinium-based cation head groups. In some embodiments, the ILCs may include an imidazolium-based cation head group of the form: $1\text{-}R_1\text{-}3\text{-}R_2\text{-}$imidazolium, where $R_1$ is an alkyl chain with a chain length ranging from 8-18 hydrocarbons, and $R_2$ is a hydrogen, methyl, ethyl, propyl, butyl, substituted or unsubstituted phenyl, or other hydrocarbon group. In some embodiments, the ILCs may include $1\text{-}R_1\text{-}3$-methylimidazolium cation head group with alkyl chain length ranging from 8 hydrocarbons (C8mim) to 18 hydrocarbons (C18mim).

In one example embodiment, the ILCs may include a 1-dodecyl-3-methylimidazolium-based cation head group (otherwise referred to as C12mim), which is a monovalent cation head group (i.e., a cation having a +1 charge) having an aromatic ring with an alkyl chain of 12 hydrocarbons covalently bound to the N1 position and a methyl group covalently bound to the N3 position of the aromatic ring. It is noted, however, that ILCs having imidazolium-based cation head groups with different alkyl chain lengths can also be provided within the solution. For example, imidazolium-based ILCs having anywhere from 8 hydrocarbons (C8mim) to 18 hydrocarbons (C18mim) in the alkyl chain can be used. It is further noted that ILCs having other cation head groups with potentially different valences and/or alkyl chain lengths may also be provided within the solution.

The ILCs used in the method 300 may also include a wide variety of anions, including monovalent anions (i.e., anions having a −1 charge), divalent anions (i.e., anions having a −2 charge) or trivalent anions (i.e., anions having a −3 charge). Examples of monovalent anions that may be included within the ILCs include, but are not limited to, tetrafluoroborate ($BF_4^-$), chloride ($Cl^-$), acetate ($CH_3COO^-$), hexafluorophosphate ($PF_6^-$), trifluoromethyl acetate ($C_3H_3F_3O_2^-$), nitrate ($NO_3^-$), dicyanamide ($C_2HN_3^-$), tetracyanoborate ($B(CN)_4^-$), trifluoromethane sulfonate ($CF_3O_3S^-$), bis((trifluoromethyl)sulfonyl)imide ($[(CF_3SO_2)_2N]^-$), tetrachloroaluminate ($[AlCl_4]^-$), heptachlorodialuminate ($[Al_2Cl_7]^-$), decachlorotrialuminate ($[Al_3Cl_{10}]^-$), tridecachlorotetraaluminate ($[Al_4Cl_{13}]^-$), tetrachloroferrate ($Cl_4Fe^-$), trichlorostannate ($[SnCl_3]^-$), pentachlorodistannate ($[Sn_2Cl_5]^-$), tetrachloroindate ($[InCl_4]^-$), nonachlorodititanate ($[Ti_2Cl_9]^-$), nonachlorodizirconate ($[Zr_2Cl_9]^-$), nonachlorodihafnate ($[Hf_2Cl_9]^-$), tetrachloroaurate ($[AuCl_4]^-$), tetrachlorogallate ($[GaCl_4]^-$), heptachlorodigallate ($[Ga_2Cl_7]^-$), decachlorotrigallate ($[Ga_3Cl_{10}]^-$), and trichloroplumbate ($[PbCl_3]^-$). Examples of divalent anions that may be included within the ILCs include, but are not limited to, pentachloridoindate ($[InCl_5]^{2-}$), tetrachlorozincate ($[ZnCl_4]^{2-}$), hexachlorodizincate ($[Zn_2Cl_6]^{2-}$), hexachlorotitanate ($[TiCl_6]^{2-}$), hexachlorozirconate ($[ZrCl_6]^{2-}$), decachlorodizirconate ($[Zr_2Cl_{10}]^{2-}$), hexachlorohafnate ($[HfCl_6]^{2-}$), decachlorodihafnate ($[Hf_2Cl_{10}]^{2-}$), tetrachloromanganate ($[MnCl_4]^{2-}$), tetrachloroferrate ($[FeCl_4]^{2-}$), tetrachlorocobaltate ($[CoCl_4]^{2-}$), tetrachloronicklate ($[NiCl_4]^{2-}$), tetrachloropaladate ($[PdCl_4]^{2-}$), tetrachloroplatinate ($[PtCl_4]^{2-}$), tetrachlorocuprate ($[CuCl_4]^{2-}$), octachlorotrizincate ($[Zn_3Cl_8]^{2-}$), decachlorotetrazincate ($[Zn_4Cl_{10}]^{2-}$), tetrachlorocadmate ($[CdCl_4]^{2-}$), hexachlorodicadmate ($[Cd_2Cl_6]^{2-}$), tetrachloromercurate ($[HgCl_4]^{2-}$), and tetrachloroplumbate ($[PbCl_4]^{2-}$). Hexachloridoindate ($[InCl_6]^{3-}$) is one example trivalent anion that may be included within the ILCs.

In some embodiments, metalate anions may be used to form metalate salt ILCs. As known in the art, a metalate anion (or "metalate") is a complex anion containing a metal ligated to several atoms or small groups. A metalate anion can include any metal and a wide variety of ligands. Examples of metals that may be included within a metalate anion include transition metals (such as, e.g., iron (Fe), copper (Cu), cobalt (Co), Zinc (Zn), Cadmium (Cd), etc.), post-transition metals (such as, e.g., aluminum (Al), indium (In), tin (Sn), lead (Pb), bismuth (Bi), etc.) and lanthanides (such as, e.g., cerium (Ce), neodymium (Nd), samarium (Sm), etc.). Examples of ligands that may be included within a metalate anion include oxo, halo, cyano (CN), thiocyano (SCN), nitrato, sulfato, phosphato, phosphine, trifluoromethane sulfonate, sulfo and carbonato ligands.

In some embodiments, a chlorometalate anion may be used as the metalate anion. Examples of chlorometalate anions that may be used to form metalate salt ILCs include, but are not limited to, chloroaluminate anions (such as, e.g., $[AlCl_4]^-$, $[Al_2Cl_7]^-$, $[Al_3Cl_{10}]^-$, $[Al_4Cl_{13}]^-$, etc.), chloroferrate anions (such as, e.g., $Cl_4Fe^-$), chlorostannate anions (such as, e.g., $[SnCl_3]^-$, $[Sn_2Cl_5]^-$, etc.), chloroindate anions (such as, e.g., $[InCl_6]^{3-}$, ($[InCl_5]^{2-}$, $[InCl_4]^-$, etc.), and chlorozincate anions (such as, e.g., $[ZnCl_4]^{2-}$, $[Zn_2Cl_6]^{2-}$, $[Zn_3Cl_8]^{2-}$, etc.).

In the method 300, the pitch of the layered structure is controlled by selecting a cation/anion charge ratio that provides a desired amount of separation between the alkyl tail groups within the tail group layers, while leveraging the charge balancing that naturally occurs during self-assembly. As used herein, the "cation/anion charge ratio" is the ratio of the cation charge to the anion charge, and thus, is determined by the valency of the cation head groups and the anions included with the ILCs.

Figure 5A:
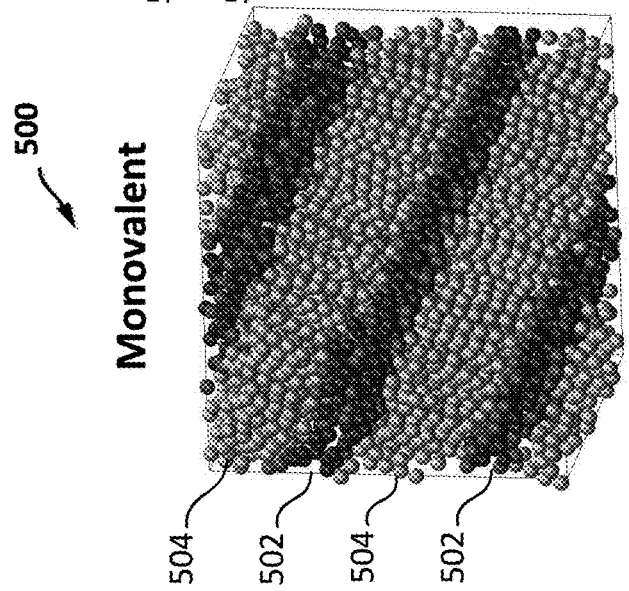
FIGS. 5A-5C are a course-grain simulations of various layered structures formed via self-assembly of 1-dodecyl-3-methylimidazolium-based ILCs having monovalent, divalent and trivalent anions, respectively, illustrating the charge driven morphology of the self-assembled ILC structures.
Figure 5A:
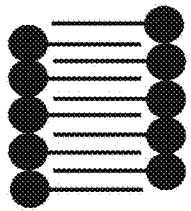

In some embodiments, the cation/anion charge ratio may be controlled in step 330 by selecting anions and cation head groups having equal valency. For example, ILCs having monovalent cation head groups and monovalent anions may be used to provide a 1:1 cation/anion charge ratio. As shown in FIG. 5A and described in more detail below, ILCs having monovalent cation head groups and monovalent anions self-assembled into layered structures having alternating layers of cation head groups and interdigitated alkyl tail groups.

Figure 5B:
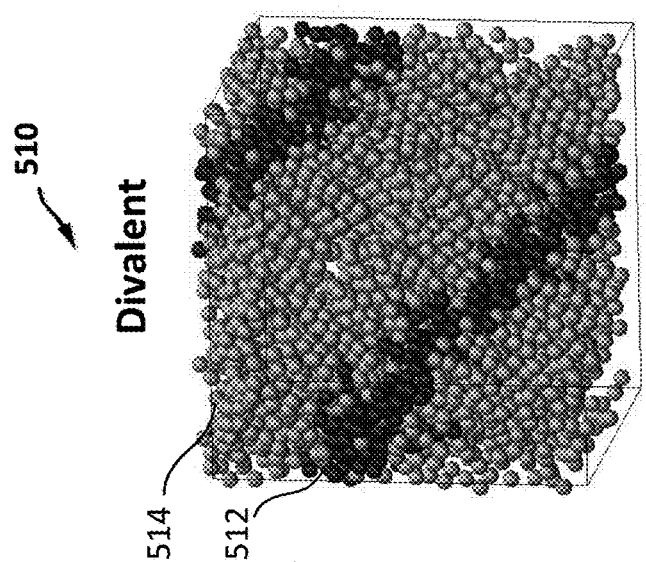
Figure 5B:
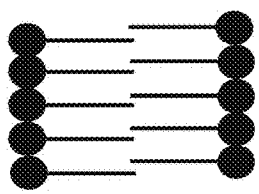
Figure 5C:
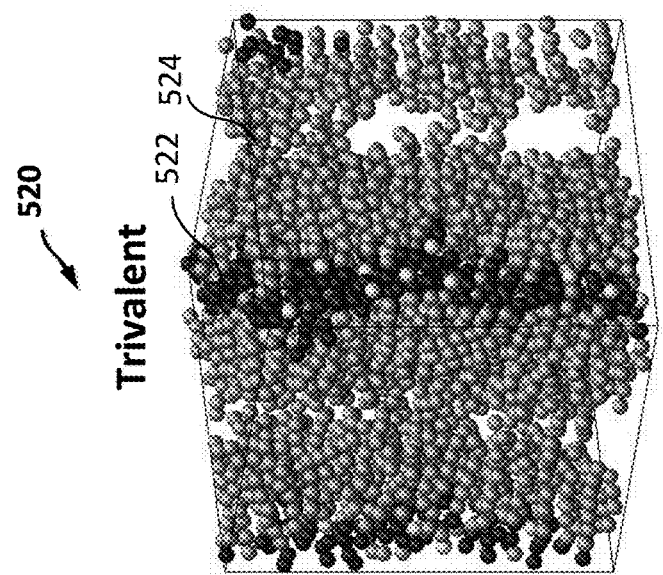
Figure 5C:
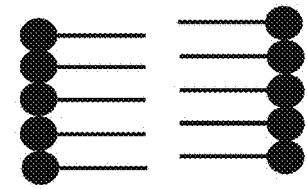

In some embodiments, the cation/anion charge ratio may be controlled in step 330 by selecting the anions and/or cation head groups of the ILCs, so that a valency of the anions is greater than the valency of the cation head groups of the ILCs. For example, ILCs having monovalent cation head groups may be combined with divalent anions to provide a 1:2 cation/anion charge ratio, or with trivalent anions to provide a 1:3 cation/anion charge ratio. As shown in FIGS. 5B-5C and described in more detail below, selecting anions whose valency is greater than that of the cation head groups prevents interdigitation of the alkyl tail groups within the tail group layers of the layered structure. The lack of interdigitation increases the pitch of the layered structure by increasing the separation between the alkyl tail groups within the tail group layers of the layered structure.

When the ILCs self-assemble on the surface of the substrate to form the layered structure in step 320, each of the anions may assemble close together with one or more cation head groups, so that the negative charge of the anion balances with the positive charge of the one or more cation head groups to provide charge neutrality within the head group layers. For example, when monovalent anions are combined with monovalent cation head groups, the cation head groups and anions of the ILCs may assemble close together within the head group layers in a 1:1 ratio to provide the self-assembled ILCs with charge neutrality. When divalent anions (or trivalent anions) are combined monovalent cation head groups, the cation head groups and anions of the ILCs may assemble close together within the head group layers in a 2:1 ratio (or a 3:1 ratio) to provide the self-assembled ILCs with charge neutrality. Since divalent anions (or trivalent anions) require two (or three) monovalent cation head groups to maintain charge neutrality, utilizing divalent anions (or trivalent anions) with monovalent cation head groups increases the pitch of the self-assembled ILCs by providing double (or triple) the volume fraction of alkyl chains within the tail group layers.

Figure 4A:
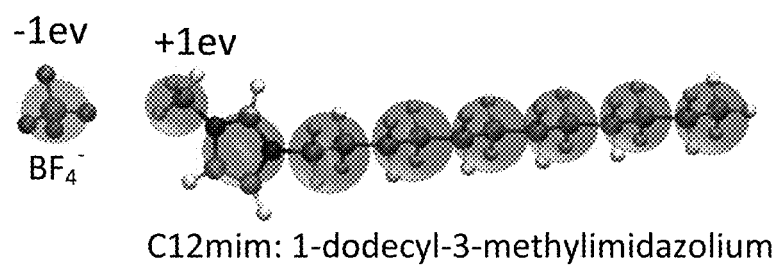
FIG. 4A is a mapping of coarse grain particles illustrating the charge balancing that occurs during self-assembly of ILCs having monovalent cation head groups and monovalent anions.
Figure 4B:
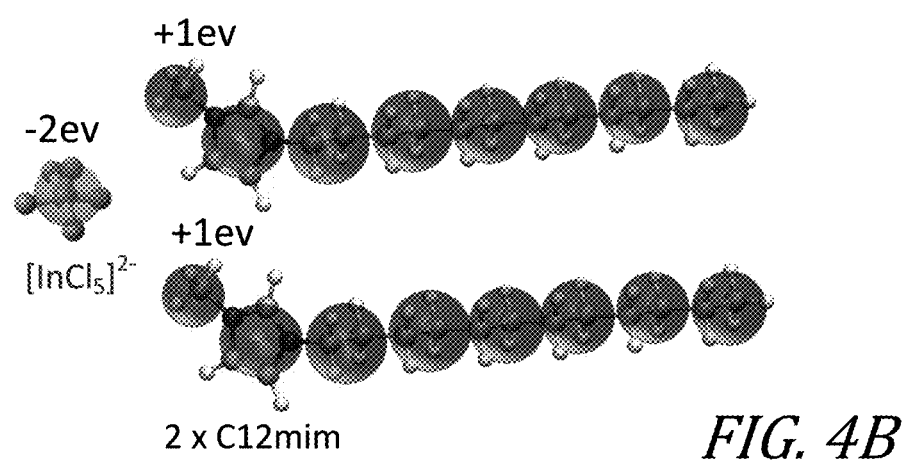
FIG. 4B is a mapping of coarse-grain particles illustrating the charge balancing that occurs during self-assembly of ILCs having monovalent cation head groups and divalent anions.
Figure 4C:
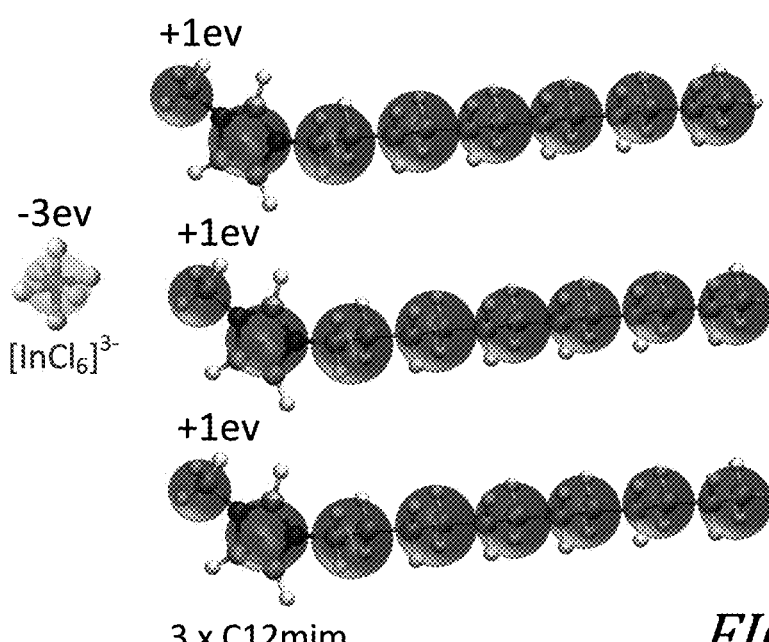
FIG. 4C is a mapping of coarse-grain particles illustrating the charge balancing that occurs during self-assembly of ILCs having monovalent cation head groups and trivalent anions.

FIGS. 4A-4C illustrate the charge balancing that occurs during self-assembly of ILCs having monovalent cation head groups and either: (A) monovalent anions, (B) divalent anions, or (C) trivalent anions. When monovalent anions (such as, e.g., $BF_4^-$) are used within ILCs having monovalent cation head groups (such as, e.g., C12mim: 1-dodecyl-3-methylimidazolium), each monovalent anion may combine with, or assemble close to, one monovalent cation head group to provide the self-assembled ILCs with charge neutrality, as shown in FIG. 4A. When divalent anions (such as, e.g., $[InCl_5]^{2-}$) are used, each divalent anion may combine with, or assemble close to, two monovalent cation head groups to provide the self-assembled ILCs with charge neutrality, as shown in FIG. 4B. Likewise, when trivalent anions (such as, e.g., $[InCl_6]^{3-}$) are used, each trivalent anion may combine with, or assemble close to, three monovalent cation head groups to provide the self-assembled ILCs with charge neutrality, as shown in FIG. 4C.

FIGS. 5A-5C illustrate various layered structures (500, 510, 520) formed via self-assembly of a 1-dodecyl-3-methylimidazolium-based ILC having monovalent, divalent and trivalent anions, respectively, illustrating the charge driven morphology of the self-assembled ILC structures. As shown in FIGS. 5A-5C, the ILCs self-assemble into layered structures 500/510/520 having alternating layers of head group layers 502/512/522 and tail group layers 504/514/524, with the cation head groups and anions of the ILCs segregated to the head group layers 502/512/522 and the alkyl tail groups of the ILCs segregated to the tail group layers 504/514/524 of the layered structures 500/510/520. The pitch between the alternating layers of the layered structures 500/510/520 is generally equal to the combined width of one head group layer and one tail group layer. However, the pitch may differ, depending on whether monovalent, divalent or trivalent anions are used within the ILCs.

As shown in FIG. 5A, ILCs having monovalent anions (e.g., $BF_4^-$) self-assemble to form a layered structure 500 having alternating layers of head group layers 502 and tail group layers 504 with interdigitated alkyl tail groups in the tail group layers 504. Due to the interdigitation of the alkyl tail groups, the pitch of layered structure 500 is roughly equivalent to the combined width of one head group layer 502 and the interdigitated alkyl tail groups in one tail group layer 504. When monovalent anions are used in 1-dodecyl-3-methylimidazolium-based ILCs to form self-assembled ILC structures, the pitch of the layered structure 500 may be approximately 3 nm, as noted above and described in more detail below in reference to FIGS. 6A and 6B.

When divalent anions (e.g., $[InCl_5]^2$) are used, the ILCs may self-assemble to form a layered structure 510 having alternating layers of head group layers 512 and tail group layers 514, as shown in FIG. 5B. Unlike the monovalent embodiment shown in FIG. 5A, the charge difference between the divalent anions and the monovalent cation head groups causes the alkyl tail groups to separate and align tip-to-tip in the tail group layers 514 of the layered structure 510. The lack of interdigitation within the tail group layers 514 increases the pitch of the layered structure 510, compared to the pitch of the layered structure 500 shown in FIG. 5A.

When trivalent anions (e.g., $[InCl_6]^{3-}$) are used, the ILCs may self-assemble to form a layered structure 520 having alternating layers of head group layers 522 and tail group layers 524, as shown in FIG. 5C. In the trivalent embodiment shown in FIG. 5C, the charge difference between the trivalent anions and the monovalent cation head groups causes the alkyl tail groups within the tail group layers 524 of the layered structure 520 to separate even further. Although this separation may further increase the pitch of the layered structure 520, compared to the monovalent and divalent embodiments shown in FIGS. 5A and 5B, the use of trivalent anions may result in a defective ILC structure if the alkyl tail groups within the tail group layers 524 become detached, as shown in FIG. 5C.

Figure 6A:
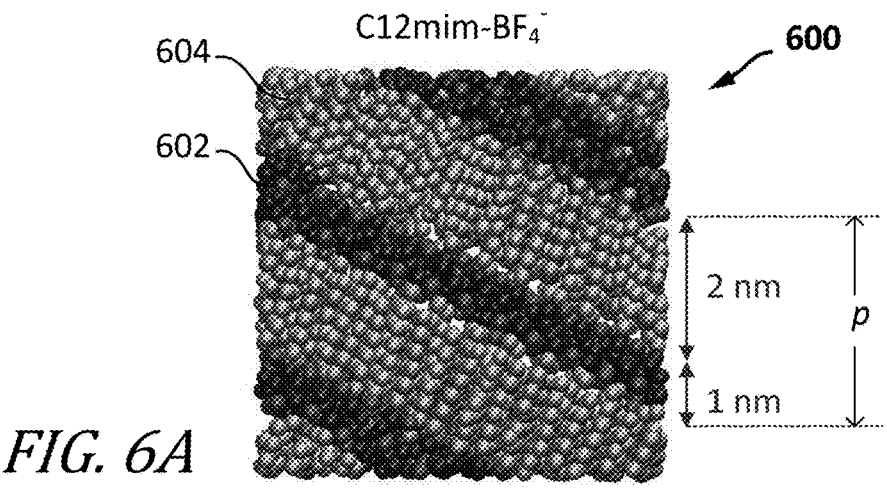
FIGS. 6A-6B are course-grain simulations of various layered structures formed via self-assembly of ILCs having monovalent cation head groups and monovalent anions.
Figure 6B:
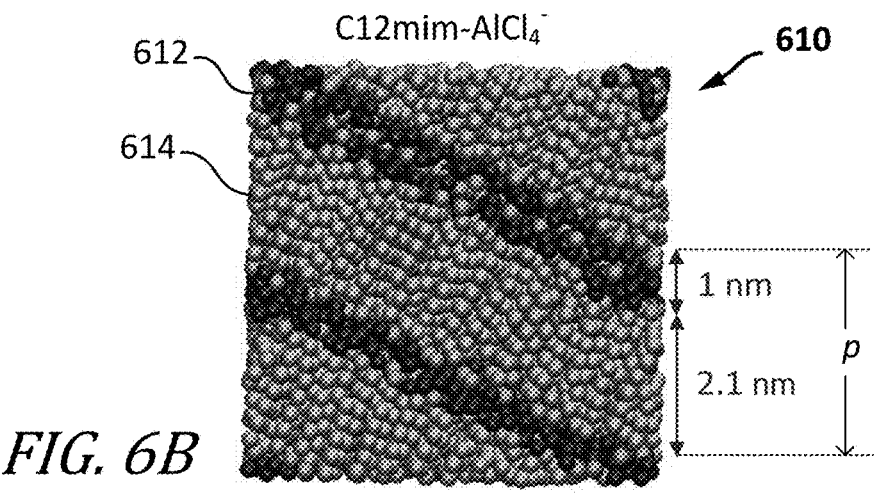

FIGS. 6A-6B illustrate various layered structures (600 and 610) formed via self-assembly of ILCs having monovalent cation head groups and monovalent anions, providing a 1:1 cation/anion charge ratio. In the embodiment shown in FIG. 6A, ILCs having 1-dodecyl-3-methylimidazolium cation head groups, an alkyl chain length of 12 hydrocarbon molecules and tetrafluoroborate ($BF_4^-$) anions are used to form a layered structure 600 having alternating layers of head group layers 602 and tail group layers 604, with interdigitated alkyl tail groups within the tail group layers 604. In the embodiment shown in FIG. 6B, ILCs having 1-dodecyl-3-methylimidazolium cation head groups, alkyl tail groups and tetrachloroaluminate ($[AlCl_4]^-$) anions are used to form another layered structure 610 having alternating layers of head group layers 612 and tail group layers 614, with interdigitated alkyl tail groups within the tail group layers 614.

The pitch (p) of the layered structures 600 and 610 is equal to the combined width of one head group layer 602/612 and the interdigitated alkyl tail groups in one tail group layers 604/614. The pitch (p) of the layered structure 600 formed using tetrafluoroborate ($BF_4^-$) anions is approximately 3 nm. Utilizing tetrachloroaluminate ($[AlCl_4]^-$) anions instead of tetrafluoroborate ($BF_4^-$) anions results in layered structure 610 having a pitch (p) of approximately 3.1 nm. Although ILCs with monovalent cations and anions are used in the example structures shown in FIGS. 6A and 6B, it is noted that layered structures of similar pitch may be formed via self-assembly of ILCs having cations and anions of different valency (e.g., 2, 3, etc.), as long as the valency of the cations and anions is the same.

The ILCs used to form the layered structures 600 and 610 have an alkyl chain length of 12 hydrocarbon molecules. In some embodiments, the pitch (p) between the alternating layers of the layered structures 600 and 610 may be: (a) increased by increasing the alkyl chain length of the ILCs, or (b) decreased by decreasing the alkyl chain length of the ILCs. However, the pitch adjustment achieved by changing the alkyl chain length of the ILCs is relatively small (e.g., about 1.5 nm). Thus, it may be desirable to adjust the pitch by changing the cation/anion charge ratio as noted above and shown, for example, in FIG. 6C.

Figure 6C:
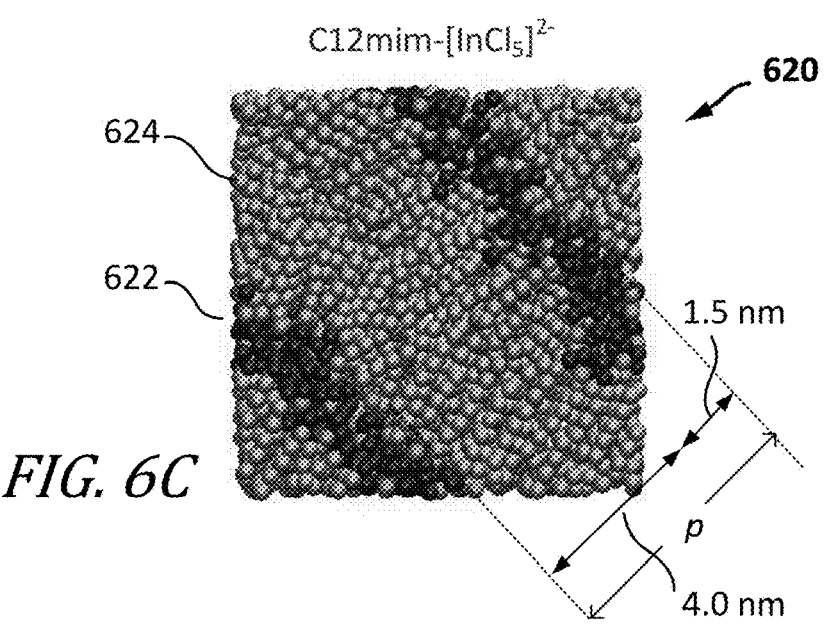
FIG. 6C is a course-grain simulation of a layered formed via self-assembly of ILCs having monovalent cation head groups and divalent anions.

FIG. 6C illustrates a layered structure 620 formed via self-assembly of ILCs having monovalent cation head groups and divalent anions, providing a 1:2 cation/anion charge ratio. In the embodiment shown in FIG. 6C, ILCs having 1-dodecyl-3-methylimidazolium cation head groups, an alkyl chain length of 12 hydrocarbon molecules and pentachloridoindate ($[InCl_5]^{2-}$) anions are used to form a layered structure 620 having alternating layers of head group layers 622 and tail group layers 624. The charge difference between the divalent anions ($[InCl_5]^{2-}$) and the monovalent cation head groups (1-dodecyl-3-methylimidazolium) causes the alkyl tail groups within the tail group layers 624 of the layered structure 620 to separate and align tip-to-tip, as shown in FIG. 6C. The tip-to-tip alignment of the alkyl tail groups increases the pitch (p) of the layered structure 620 by increasing the width of the tail group layers 624 (e.g., from about 2 nm to 4 nm). Compared to the layered structures 600 and 610 having interdigitated alkyl tail groups, the tip-to-tip alignment of the alkyl tail groups within the tail group layers 624 of the layered structure 620 increases the pitch (p) of the layered structure 620 by approximately 83% to 5.5 nm. This provides significantly greater pitch adjustment than simply increasing (or decreasing) the alkyl chain length of the ILCs. Although ILCs having monovalent cations and divalent anions are used in the example structure shown in FIG. 6C, it is noted that layered structures of similar pitch may be formed via self-assembly of ILCs having cations and anions of different valency (e.g., 2, 3, etc.), as long as the ILCs maintain an equivalent cation/anion charge ratio.

As noted above and demonstrated in FIGS. 6A-6C, the pitch (p) of the layered structures 600/610/620 can be controlled by controlling the cation/anion charge ratio of the cation head groups and the anions of the ILCs used to form the layered structures. Unlike previous methods, which adjust the alkyl chain length to provide minor pitch adjustments, the methods disclosed herein provide greater pitch control by selecting the valency of the cation head groups and anions of the ILCs to: (a) increase the cation/anion charge ratio and increase the pitch of the self-assembled ILC structures, or (b) decrease the cation/anion charge ratio and decrease the pitch of the self-assembled ILC structures. As shown in FIGS. 6A-6C, increasing the cation/anion charge ratio from 1:1 to 1:2 increases the pitch (p) of the self-assembled ILC structures by preventing interdigitation of the alkyl tail groups within the tail group layers of the self-assembled ILC structures.

In some embodiments, additional techniques may be used in conjunction with the techniques described above to further control the pitch of self-assembled ILC structures. For example, an ionic liquid (IL) may be added to the ILC solution to increase the pitch (p) of the layered structure. Similar to ILCs, ionic liquids have cation head groups, alkyl tail groups and anions. Unlike ILCs, the alkyl tail groups included within ionic liquids have less than 8 hydrocarbons and do not drive ordering or phase separation during self-assembly. When an ionic liquid is added to the ILC solution, the cation head groups of the ionic liquid assemble together with the cation head groups and anions of the ILCs within the head group layers of the layered structure to maintain charge balance within the head group layers of the layered structure. The addition of the IL cation head groups within the head group layers of the layered structure increases the volume fraction of the head group layers relative to the tail group layers, thus increasing the width or thickness of the head group layers to further increase the pitch (p) of the layered structure.

Figure 7:
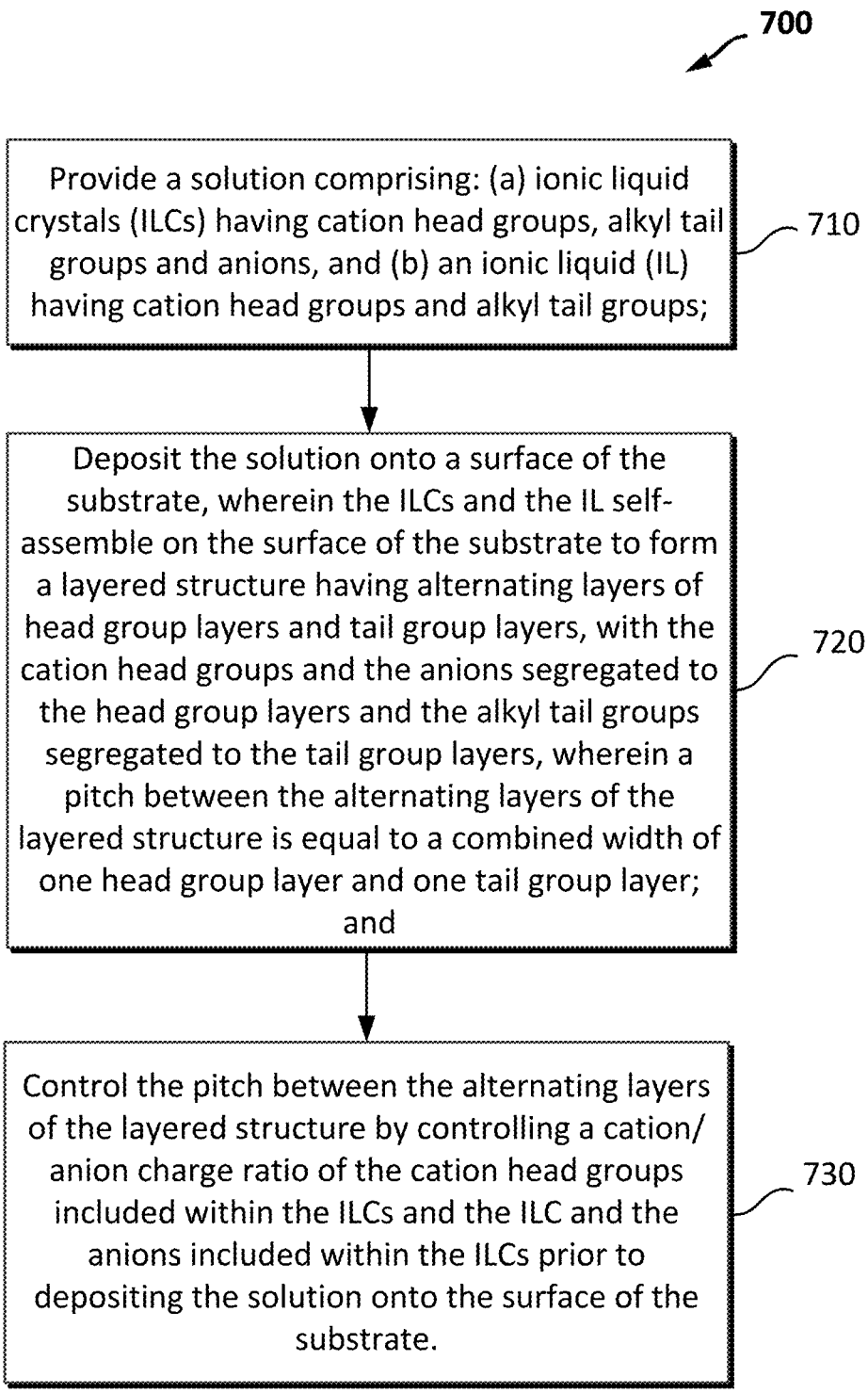
FIG. 7 is a flowchart diagram illustrating another method that may be used to control a pitch of a self-assembled ILC structure formed on a substrate in accordance with another embodiment of the present disclosure.

FIG. 7 illustrates another embodiment of a method 700 that uses the techniques described herein to control a pitch of a self-assembled ILC structure formed on a substrate. It will be recognized that the embodiment of the method 700 shown in FIG. 7 is merely exemplary and additional methods may utilize the techniques described herein. Further, additional processing steps may be added to the method 700 shown in FIG. 7 as the steps described are not intended to be exclusive. Moreover, the order of the steps is not limited to the order shown in the figure as different orders may occur and/or various steps may be performed in combination or at the same time.

The method 700 shown in FIG. 7 includes providing a solution comprising: (a) ionic liquid crystals (ILCs) having cation head groups, alkyl tail groups and anions, and (b) an ionic liquid (IL) having cation head groups and alkyl tail groups (in step 710) and depositing the solution onto a surface of a substrate (in step 720). Once deposited, the ILCs and the IL self-assemble on the surface of the substrate to form a layered structure having alternating layers of head group layers and tail group layers, with the cation head groups and the anions segregated to the head group layers and the alkyl tail groups segregated to the tail group layers. As noted above, the pitch between the alternating layers of the layered structure may be substantially equal to a combined width of one head group layer and one tail group layer. The method 700 further includes controlling the pitch between the alternating layers of the layered structure by controlling a cation/anion charge ratio of the cation head groups included within the ILCs and the IL and the anions included within the ILCs (in step 730) before the solution is deposited onto the surface of the substrate (in step 720). In some embodiments, the method 700 may use the layered structure to form a pattern on the substrate.

In some embodiments, the cation/anion charge ratio may be controlled in step 730 by: (a) selecting the anions and/or cation head groups of the ILCs, so that a valency of the anions is greater than the valency of the cation head groups of the ILCs, and (b) selecting the cation head groups of the IL to balance the charge of the anions and cation head groups included within the head group layers of the layered structure. For example, the cation/anion charge ratio may be controlled in step 730 by providing a solution in step 710 that combines an ionic liquid (IL) having monovalent cation head groups with ILCs having monovalent cation head groups and divalent anions.

A wide variety of ionic liquids having monovalent cation head groups and ILCs having monovalent cation head groups and divalent anions may be used within the solution. In some embodiments, ionic liquids and ILCs having imidazolium-based cation head groups may be used. As noted above, ILCs having an imidazolium-based cation head group may be of the form: 1-$R_1$-3-$R_2$-imidazolium, where $R_1$ is an alkyl chain with a chain length ranging from 8-18 hydrocarbons, and $R_2$ is a hydrogen, methyl, ethyl, propyl, butyl, substituted or unsubstituted phenyl, or other hydrocarbon group. Similar to ILCs, ionic liquids having an imidazolium-based cation head group may be of the form: 1-$R_1$-3-$R_2$-imidazolium, where $R_1$ is an alkyl chain with a chain length ranging from 1-7 hydrocarbons, and $R_2$ is a hydrogen, methyl, ethyl, propyl, butyl, substituted or unsubstituted phenyl, or other hydrocarbon group. In some embodiments, the ILCs and ionic liquid included within the solution may have 1-$R_1$-3-methylimidazolium cation head groups. For the ILCs, the alkyl chain length may range from 8 hydrocarbons (C8mim) to 18 hydrocarbons (C18mim). For the ionic liquid (IL), the alkyl chain length may range from 1 hydrocarbons (C1mim) to 7 hydrocarbons (C7mim). In one example embodiment, the solution provided in step 710 may combine an ionic liquid (IL) having Emim (1-ethyl-3-methylimidazolium) cation head groups with ILCs having C12mim (1-dodecyl-3-methylimidazolium) cation head groups and divalent anions.

Figure 8A:
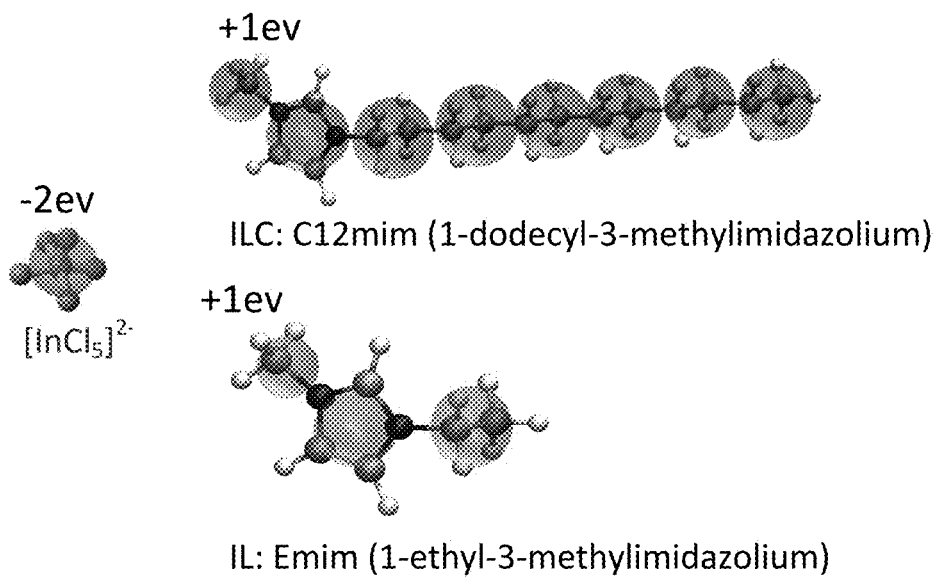
FIG. 8A is a mapping of coarse-grain particles illustrating the charge balancing that occurs during self-assembly of ILCs having monovalent cation head groups and divalent anions when an ionic liquid (IL) having monovalent cation head groups is added to the ILC solution.

FIG. 8A illustrates the charge balancing that occurs during self-assembly of ILCs having monovalent cation head groups and divalent anions when an ionic liquid (IL) having monovalent cation head groups is added to the ILC solution. When an ionic liquid having monovalent cation head groups (e.g., Emim: 1-ethyl-3-methylimidazolium) is added to a solution of ILCs having monovalent cation head groups (e.g., C12mim: 1-dodecyl-3-methylimidazolium) and divalent anions (e.g., $[InCl_5]^{2-}$), each of the divalent anions may combine with, or assemble close to, one cation head group of the ILCs and one cation head group of the IL within the head group layers of the layered structure to maintain charge neutrality, as shown in FIG. 8A.

Figure 8B:
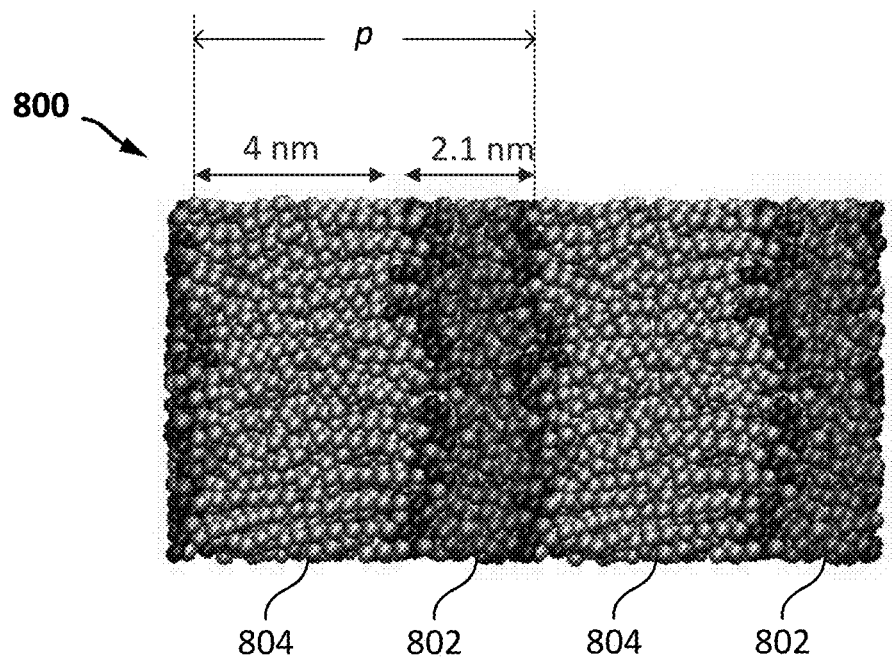
FIG. 8B is a course-grain simulation of a layered structure formed via self-assembly of the ILCs and the ionic liquid (IL) shown in FIG. 8A.

FIG. 8B illustrates a layered structure 800 formed via self-assembly of the ILCs and ionic liquid (IL) shown in FIG. 8A. In the embodiment shown in FIG. 8B, ILCs having 1-dodecyl-3-methylimidazolium cation head groups, an alkyl chain length of 12 hydrocarbon molecules and pentachloridoindate ($[InCl_5]^{2-}$) anions self-assemble with an ionic liquid (IL) having 1-ethyl-3-methylimidazolium cation head groups to form a layered structure 800 having alternating layers of head group layers 802 and tail group layers 804. The charge difference between the divalent anions ($[InCl_5]^{2-}$) and monovalent cation head groups (1-dodecyl-3-methylimidazolium) of the ILCs causes the alkyl tail groups within the tail group layers 804 of the layered structure 800 to separate and align tip-to-tip, as shown in FIG. 8B.

Similar to the previous embodiment shown in FIG. 6C, the lack of interdigitation within the tail group layers 804 of the layered structure 800 increases the pitch (p) of the layered structure 800. Compared to the layered structures 600 and 610 having interdigitated alkyl tail groups, the tip-to-tip alignment of the alkyl tail groups within the tail group layers 804 of the layered structure 800 increases the pitch (p) of the layered structure 800 by increasing the width of the tail group layers 624 (e.g., from 2 nm to 4 nm). In the layered structure 800, the pitch (p) is further increased by the addition of the IL cation head groups within the head group layers 802, which increases the width of the head group layers 802 (e.g., from 1.5 nm to 2.1 nm). Thus, the lack of interdigitation within the tail group layers 804 and the addition of IL cation head groups within the head group layers 802 of the layered structure 800 increases the pitch (p) of the layered structure 800 by approximately 103% to 6.1 nm compared to the layered structures 600 and 610 having interdigitated alkyl tail groups.

Various embodiments of methods are provided herein for controlling the pitch (p) of self-assembled ILCs structures. In the disclosed embodiments, the pitch (p) of a layered structure is controlled by controlling a cation/anion charge ratio of the cation head groups and anions of the ILCs used to form the layered structure. Depending on the valency of the cation head groups and anions included within the ILCs, the ILCs may self-assemble with interdigitated alkyl tail groups, alkyl tail groups aligned tail-to-tail, or alkyl tail groups that are spaced even further apart.

In some embodiments, the valency of the cation head groups and anions included within the ILCs may be selected to: (a) increase the cation/anion charge ratio to increase the separation between the alkyl tail groups within the tail group layers of the layered structure, thus increasing the width of the tail group layers to increase the pitch (p) of the layered structure, or (b) decrease the cation/anion charge ratio to decrease the separation between the alkyl tail groups within the tail group layers of the layered structure, thus decreasing the width of the tail group layers to decrease the pitch (p) of the layered structure. In some embodiments, an ionic liquid (IL) may be added to the ILCs to further increase the pitch (p) of the layered structures by increasing the width of the head group layers. In some embodiments, minor pitch adjustments can also be made by changing the alkyl chain length of the ILCs and/or the IL.

The techniques described herein can be used to control the pitch of self-assembled ILCs structures formed on a substrate surface. In some embodiments, additional techniques can be combined with those described herein to: (a) change the phase of the self-assembled ILCs structures formed on the substrate surface, (b) tune the orientation of the self-assembled ILCs structures formed on a wide variety of substrate surfaces and/or (c) overcome the challenges faced when transferring the patterning information of the self-assembled ILCs structures to an underlying substrate.

Co-pending U.S. patent application Ser. No. 18/677,975, entitled "Methods for Controlling the Phase of Self-Assembled Ionic Liquid Crystal (ILC) Structures," provides various methods for controlling the phase of the self-assembled ILC structures. As noted in the co-pending application, the mesophase (or simply "phase") of an ordered structure can be controlled by replacing hydrogen (H) atoms within the alkyl chain with larger sized functional groups (such as, e.g., methyl groups, ethyl groups, n-propyl groups, iso-propyl groups, etc.). Adding larger sized functional groups to the alkyl chain changes the phase of the ordered structure by: (a) increasing the separation between the hydrophilic (cation) and hydrophobic (alkyl tail) groups of the ILCs, and (b) changing the orientation of alkyl tails within the tail groups of the self-assembled ILCs. In some embodiments, H atoms may be replaced with larger $CH_3$ groups to prevent the alkyl tails from interdigitating and change the orientation of the alky tails within the tail groups of the self-assembled ILCs, thereby changing the layered structure to nanopore/rod structure.

Co-pending U.S. patent application Ser. No. 18/388,240, entitled "Methods for Forming Vertically Layered Ionic Liquid Crystal (ILC) Structures on a Semiconductor Substrate," provides various methods for forming vertically layered ILC structures on a wide variety of substrate surfaces. As noted in the co-pending application, a vertically layered structure may be formed on a variety of substrate surfaces by exposing the ILC solution to a gas phase, non-polar solvent (such as, e.g., hexane gas) as the ILC solution is being deposited onto the substrate surface. The gas phase, non-polar solvent provides an ambient environment, which neither attracts nor repels the polar molecules of the ILCs. This enables the ILCs to orient themselves into a vertically layered structure on a periodic substrate surface, as shown for example in FIG. 2B, and/or within features (e.g., trenches, holes, etc.) having a neutral bottom surface and hydrophilic sidewalls, as shown in FIG. 2C.

In some embodiments, the vertically layered structure may be used to pattern a substrate surface. However, forming a vertically layered structure on a substrate surface is only one challenge that must be overcome to enable self-assembled ILCs to be used for pattern transfer. After a vertically layered pattern of self-assembled ILCs is formed on a substrate surface, additional challenges must be overcome to successfully transfer the vertically layered pattern to an underlying surface. For example, removing the alkyl tail groups from the ILC film leaves an ionic liquid on the substrate surface. On the other hand, removing the cation head groups from the ILC film leaves the alkyl tail groups, which are also liquid at room temperature. The remaining group (e.g., the anions) within the ILC film is mobile in both of these options, so no patterning information will be maintained if one or more groups of the self-assembled ILC is removed.

Co-pending U.S. patent application Ser. No. 18/388,222, entitled "Methods for Patterning a Semiconductor Substrate Using Metalate Salt Ionic Liquid Crystals," overcomes the challenges faced when transferring the patterning information of self-assembled ILCs to an underlying substrate. The co-pending application discloses various methods to pattern a semiconductor substrate using direct self-assembly of metalate salt ILCs followed by oxidation of the self-assembled metalate salt ILC film to produce a robust metal oxide pattern, which can be transferred to an underlying layer of a semiconductor substrate.

As noted in the co-pending application, metalate salt ILCs can be synthesized by dissolving stoichiometric amounts of metal halides in imidazolium-based ILCs with a halide anion. A wide variety of metal halides and halide anions can be combined with imidazolium-based ILCs to synthesize metalate salt ILCs. For example, aluminum chloride ($AlCl_3$) can be dissolved in 1-docecyl-3-methylimidazolium chloride to form 1-dodecyl-3-methylimidazolium tetrachloroaluminate. The metalate salt ILCs formed in such synthesis contain an imidazolium-based cation head group covalently bound to an elongated alkyl tail group and metalate anion (e.g., tetrachloroaluminate ($AlCl_4^-$)). Other metalate salt ILCs can be formed by dissolving other metal halides in ionic liquid crystal (ILC) halide salts.

Similar to other ILCs, metalate salt ILCs can self-assemble into solid (crystalline phase) ordered structures at or near room temperature. The difference in polarity between the cation head groups and the metalate anions promote direct self-assembly of the metalate salt ILC molecules by segregating the head and tail groups into layered structures (or "lamellar structures") with the cation head groups and metalate anions segregated to the head group layers and the alkyl tail groups segregated to the tail group layers. Similar to other ILCs, the orientation of the self-assembled metalate salt ILCs can be controlled by controlling the deposition temperature and the hydrophobicity of the surface(s) upon which the metalate salt ILCs are deposited. In some embodiments, the layer pitch of the self-assembled metalate salt ILCs can be controlled by: (a) controlling the cation/anion charge ratio of the cation head groups and anions included within the metalate salt ILCs, and/or (b) adding an ionic liquid to the metalate salt ILCs. For 1-dodecyl-3-methyl-imidazolium-based metalate salt ILCs, the layer pitch may be range between approximately 3-6 nm by performing one or more of the pitch control methods (a)-(b).

After self-assembly, an oxidation process (e.g., an oxygen plasma ashing, ultra-violet (UV) ozone, gas phase oxidation or solution phase oxidation process) can be used to oxidize the metalate salt ILC film and form a more robust pattern that can be transferred to the underlying substrate. The oxidation process removes the alkyl tail group layers from the vertically layered ILC structures by converting the organic material within the alkyl tail group layers into volatile carbon oxides, which are removed from the substrate surface during the oxidation process. However, the metalate anions within the head group layers are converted into non-volatile metal oxides, which are left on the substrate surface after oxidation. In doing so, the oxidation process volatizes the ionic liquid crystal layer, but leaves behind a metal oxide pattern where the metalate anions were concentrated. The metal oxide pattern left on the substrate surface is more robust than the ILC film, and as such, can be used as a hard mask for pattern transfer to underlying layer(s).

The term "semiconductor substrate" or "substrate" as used herein means and includes a base material or construction upon which materials are formed. It will be appreciated that the substrate may include a single material, a plurality of layers of different materials, a layer or layers having regions of different materials or different structures in them, etc. These materials may include semiconductors, insulators, conductors, or combinations thereof. For example, the substrate may be a semiconductor substrate, a base semiconductor layer on a supporting structure, a metal electrode or a semiconductor substrate having one or more layers, structures or regions formed thereon. The substrate may be a conventional silicon substrate or other bulk substrate comprising a layer of semi-conductive material. As used herein, the term "bulk substrate" means and includes not only silicon wafers, but also silicon-on-insulator ("SOI") substrates, such as silicon-on-sapphire ("SOS") substrates and silicon-on-glass ("SOG") substrates, epitaxial layers of silicon on a base semiconductor foundation, and other semiconductor or optoelectronic materials, such as silicon-germanium, germanium, gallium arsenide, gallium nitride, and indium phosphide. The substrate may be doped or undoped.

The substrate may also include any material portion or structure of a device, particularly a semiconductor or other electronics device, and may, for example, be a base substrate structure, such as a semiconductor substrate or a layer on or overlying a base substrate structure. Thus, the term "substrate" is not intended to be limited to any particular base structure, underlying layer or overlying layer, patterned layer or unpatterned layer, but rather, is contemplated to include any such layer or base structure, and any combination of layers and/or base structures.

It is noted that reference throughout this specification to "one embodiment" or "an embodiment" means that a particular feature, structure, material, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention. Furthermore, the particular features, structures, materials, or characteristics may be combined in any suitable manner in one or more embodiments. Various additional layers and/or structures may be included and/or described features may be omitted in other embodiments.

One skilled in the relevant art will recognize that the various embodiments may be practiced without one or more of the specific details, or with other replacement and/or additional methods, materials, or components. In other instances, well-known structures, materials, or operations are not shown or described in detail to avoid obscuring aspects of various embodiments of the invention. Similarly, for purposes of explanation, specific numbers, materials, and configurations are set forth in order to provide a thorough understanding of the invention. Nevertheless, the invention may be practiced without specific details. Furthermore, it is understood that the various embodiments shown in the figures are illustrative representations and are not necessarily drawn to scale.

Further modifications and alternative embodiments of the methods described herein will be apparent to those skilled in the art in view of this description. It will be recognized, therefore, that the described methods are not limited by these example arrangements. It is to be understood that the forms of the methods herein shown and described are to be taken as example embodiments. Various changes may be made in the implementations. Thus, although the inventions are described herein with reference to specific embodiments, various modifications and changes can be made without departing from the scope of the present inventions. Accordingly, the specification and figures are to be regarded in an illustrative rather than a restrictive sense, and such modifications are intended to be included within the scope of the present inventions. Further, any benefits, advantages, or solutions to problems that are described herein with regard to specific embodiments are not intended to be construed as a critical, required, or essential feature or element of any or all the claims.

What is claimed is:

1. A method to control a pitch of a self-assembled ionic liquid crystal (ILC) structure formed on a substrate, the method comprising:
    providing a solution comprising ionic liquid crystals (ILCs) having cation head groups, alkyl tail groups and anions;
    depositing the solution onto a surface of the substrate, wherein the ILCs self-assemble on the surface of the substrate to form a layered structure having alternating layers of head group layers and tail group layers, with the cation head groups and the anions segregated to the head group layers and the alkyl tail groups segregated to the tail group layers, wherein a pitch between the alternating layers of the layered structure is equal to a combined width of one head group layer and one tail group layer; and
    controlling the pitch between the alternating layers of the layered structure by controlling a cation/anion charge ratio of the cation head groups and the anions included within the ILCs prior to depositing the solution onto the surface of the substrate.

2. The method of claim 1, further comprising utilizing the layered structure to form a pattern on the substrate.

3. The method of claim 1, wherein said controlling the cation/anion charge ratio comprises selecting the anions and the cation head groups included within the ILCs, so that a valency the anions is greater than a valency of the cation head groups to prevent interdigitation of the alkyl tail groups within the tail group layers and increase the pitch between the alternating layers of the layered structure.

4. The method of claim 3, wherein the cation head groups comprise monovalent cation head groups, and wherein the anions comprise divalent anions or trivalent anions.

5. The method of claim 3, wherein the ILCs comprise divalent anions and imidazolium-based cation head groups of the form: 1-$R_1$-3-$R_2$-imidazolium, where $R_1$ is an alkyl chain with a chain length ranging from 8-18 hydrocarbons, and $R_2$ is a methyl group.

6. The method of claim 5, wherein the imidazolium-based cation head groups comprise 1-dodecyl-3-methylimidazolium.

7. The method of claim 5, wherein the divalent anions comprise pentachloridoindate ($[InCl_5]^{2-}$), tetrachlorozincate ($[ZnCl_4]^{2-}$), hexachlorodizincate ($[Zn_2Cl_6]^{2-}$), hexachlorotitanate ($[TiCl_6]^{2-}$), hexachlorozirconate ($[ZrCl_6]^{2-}$), decachlorodizirconate ($[Zr_2Cl_{10}]^{2-}$), hexachlorohafnate ($[HfCl_6]^{2-}$), decachlorodihafnate ($[Hf_2Cl_{10}]^{2-}$), tetrachloromanganate ([MnCl$_4$]$^{2-}$), tetrachloroferrate ([FeCl$_4$]$^{2-}$), tetrachlorocobaltate ([CoCl$_4$]$^{2-}$), tetrachloronicklate ([NiCl$_4$]$^{2-}$), tetrachloropaladate ([PdCl$_4$]$^{2-}$), tetrachloroplatinate ([PtCl$_4$]$^{2-}$), octachlorotrizincate ([Zn$_3$Cl$_8$]$^{2-}$), decachlorotetrazincate ([Zn$_4$Cl$_{10}$]$^{2-}$), tetrachlorocadmate ([CdCl$_4$]$^{2-}$), hexachlorodicadmate ([Cd$_2$Cl$_6$]$^{2-}$), tetrachloromercurate ([HgCl$_4$]$^{2-}$), or tetrachloroplumbate ([PbCl$_4$]$^{2-}$).

8. The method of claim 1, wherein the cation head groups comprise monovalent cation head groups and the anions comprise monovalent anions, wherein when the ILCs self-assemble on the surface of the substrate to form the layered structure: (a) each monovalent anion assembles together with one monovalent cation head group within the head group layers of the layered structure to provide the self-assembled ILCs with charge neutrality, and (b) the alkyl tail groups interdigitate together within the tail group layers of the layered structure.

9. The method of claim 8, wherein the pitch between the alternating layers of the layered structure is equal to the combined width of the one head group layer and the interdigitated alkyl tail groups in the one tail group layer.

10. The method of claim 8, wherein the monovalent cation head groups comprise imidazolium-based cation head groups of the form: 1-R$_1$-3-R$_2$-imidazolium, where R$_1$ is an alkyl chain with a chain length ranging from 8-18 hydrocarbons, and R$_2$ is a methyl group.

11. The method of claim 8, wherein the monovalent anions comprise tetrafluoroborate (BF$_4^-$), chloride (Cl$^-$), acetate (CH$_3$COO$^-$), hexafluorophosphate (PF$_6^-$), trifluoromethyl acetate (C$_3$H$_3$F$_3$O$_2^-$), nitrate (NO$_3^-$), dicyanamide (C$_2$HN$_3^-$), tetracyanoborate (B(CN)$_4^-$), trifluoromethane sulfonate (CF$_3$O$_3$S$^-$), bis((trifluoromethyl)sulfonyl)imdide ([(CF$_3$SO$_2$)$_2$N]$^-$), tetrachloroaluminate ([AlCl$_4$]$^-$), heptachlorodialuminate ([Al$_2$Cl$_7$]$^-$), decachlorotrialuminate ([Al$_3$Cl$_{10}$]$^-$), tridecachlorotetraaluminate ([Al$_4$Cl$_{13}$]$^-$), tetrachloroferrate (Cl$_4$Fe$^-$), trichlorostannate ([SnCl$_3$]$^-$), pentachlorodistannate ([Sn$_2$Cl$_5$]$^-$), tetrachloroindate ([InCl$_4$]$^-$), nonachloroditianate ([Ti$_2$Cl$_9$]$^-$), nonachlorodizirconate ([Zr$_2$Cl$_9$]$^-$), nonachlorodihafnate ([Hf$_2$Cl$_9$]$^-$), tetrachloroaurate ([AuCl$_4$]$^-$), tetrachlorogallate ([GaCl$_4$]$^-$), heptachlorodigallate ([Ga$_2$Cl$_7$]$^-$), decachlorotrigallate ([Ga$_3$Cl$_{10}$]$^-$), or trichloroplumbate ([PbCl$_3$]$^-$).

12. The method of claim 1, wherein the cation head groups comprise monovalent cation head groups and the anions comprise divalent anions, wherein when the ILCs self-assemble on the surface of the substrate to form the layered structure: (a) each divalent anion assembles together with two monovalent cation head groups within the head group layers of the layered structure to provide the self-assembled ILCs with charge neutrality, and (b) the alkyl tail groups align tip-to-tip within the tail group layers of the layered structure.

13. The method of claim 12, wherein the pitch between the alternating layers of the layered structure is equal to the combined width of the one head group layer and the alkyl tail groups aligned tip-to-tip within the one tail group layer.

14. The method of claim 12, wherein the monovalent cation head groups comprise imidazolium-based cation head groups of the form: 1-R$_1$-3-R$_2$-imidazolium, where R$_1$ is an alkyl chain with a chain length ranging from 8-18 hydrocarbons, and R$_2$ is a methyl group.

15. The method of claim 12, wherein the divalent anions comprise pentachloridoindate ([InCl$_5$]$^{2-}$), tetrachlorozincate ([ZnCl$_4$]$^{2-}$), hexachlorodizincate ([Zn$_2$Cl$_6$]$^{2-}$), hexachlorotitanate ([TiCl$_6$]$^{2-}$), hexachlorozirconate ([ZrCl$_6$]$^{2-}$), decachlorodizirconate ([Zr$_2$Cl$_{10}$]$^{2-}$), hexachlorohafnate ([HfCl$_6$]$^{2-}$), decachlorodihafnate ([Hf$_2$Cl$_{10}$]$^{2-}$), tetrachloromanganate ([MnCl$_4$]$^{2-}$), tetrachloroferrate ([FeCl$_4$]$^{2-}$), tetrachlorocobaltate ([CoCl$_4$]$^{2-}$), tetrachloronicklate ([NiCl$_4$]$^{2-}$), tetrachloropaladate ([PdCl$_4$]$^{2-}$), tetrachloroplatinate ([PtCl$_4$]$^{2-}$), tetrachlorocuprate ([CuCl$_4$]$^{2-}$), octachlorotrizincate ([Zn$_3$Cl$_8$]$^{2-}$), decachlorotetrazincate ([Zn$_4$Cl$_{10}$]$^{2-}$), tetrachlorocadmate ([CdCl$_4$]$^{2-}$), hexachlorodicadmate ([Cd$_2$Cl$_6$]$^{2-}$), tetrachloromercurate ([HgCl$_4$]$^{2-}$), or tetrachloroplumbate ([PbCl$_4$]$^{2-}$).

16. A method to control a pitch of a self-assembled ionic liquid crystal (ILC) structure formed on a substrate, the method comprising:
    providing a solution comprising: (a) ionic liquid crystals (ILCs) having cation head groups, alkyl tail groups and anions, and (b) an ionic liquid (IL) having cation head groups and alkyl tail groups;
    depositing the solution onto a surface of the substrate, wherein the ILCs and the IL self-assemble on the surface of the substrate to form a layered structure having alternating layers of head group layers and tail group layers, with the cation head groups and the anions segregated to the head group layers and the alkyl tail groups segregated to the tail group layers, wherein a pitch between the alternating layers of the layered structure is equal to a combined width of one head group layer and one tail group layer; and
    controlling the pitch between the alternating layers of the layered structure by controlling a cation/anion charge ratio of the cation head groups included within the ILCs and the IL and the anions included within the ILCs prior to depositing the solution onto the surface of the substrate.

17. The method of claim 16, further comprising utilizing the layered structure to form a pattern on the substrate.

18. The method of claim 16, wherein the ILCs comprise monovalent cation head groups and divalent anions, wherein the IL comprises monovalent cation head groups, and wherein when the ILCs and the IL self-assemble on the surface of the substrate to form the layered structure: (a) each divalent anion assembles together with one monovalent cation head group of the ILCs and one monovalent cation head group of the IL within the head group layers of the layered structure to provide the self-assembled ILCs with charge neutrality, and (b) the alkyl tail groups align tip-to-tip within the tail group layers of the layered structure.

19. The method of claim 18, wherein the pitch between the alternating layers of the layered structure is equal to the combined width of the one head group layer and the alkyl tail groups aligned tip-to-tip within the one tail group layer.

20. The method of claim 18, wherein the ILCs and the ionic liquid each comprise imidazolium-based cation head groups of the form: 1-R$_1$-3-methylimidazolium, where R$_1$ is an alkyl chain with a chain length ranging from 8-18 hydrocarbons for the ILCs and 1 7 hydrocarbons for the ionic liquid.

21. The method of claim 18, wherein the ILCs comprise 1-dodecyl-3-methylimidazolium cation head groups and the IL comprises 1-ethyl-3-methylimidazolium cation head groups.

22. The method of claim 18, wherein the divalent anions comprise pentachloridoindate ([InCl$_5$]$^{2-}$), tetrachlorozincate ([ZnCl$_4$]$^{2-}$), hexachlorodizincate ([Zn$_2$Cl$_6$]$^{2-}$), hexachlorotitanate ([TiCl$_6$]$^{2-}$), hexachlorozirconate ([ZrCl$_6$]$^{2-}$), decachlorodizirconate ([Zr$_2$Cl$_{10}$]$^{2-}$), hexachlorohafnate ([HfCl$_6$]$^{2-}$), decachlorodihafnate ([Hf$_2$Cl$_{10}$]$^{2-}$), tetrachloromanganate ([MnCl$_4$]$^{2-}$), tetrachloroferrate ([FeCl$_4$]$^{2-}$), tetrachlorocobaltate ([CoCl$_4$]$^{2-}$), tetrachloronicklate ([Ni- $Cl_4]^{2-}$), tetrachloropaladate ($[PdCl_4]^{2-}$), tetrachloroplatinate ($[PtCl_4]^{2-}$), tetrachlorocuprate ($[CuCl_4]^{2-}$), octachlorotrizincate ($[Zn_3Cl_8]^{2-}$), decachlorotetrazincate ($[Zn_4Cl_{10}]^{2-}$), tetrachlorocadmate ($[CdCl_4]^{2-}$), hexachlorodicadmate ($[Cd_2Cl_6]^{2-}$), tetrachloromercurate ($[HgCl_4]^{2-}$), or tetrachloroplumbate ($[PbCl_4]^{2-}$).

* * * * *